US008644036B2

(12) United States Patent
Sato et al.

(10) Patent No.: US 8,644,036 B2
(45) Date of Patent: Feb. 4, 2014

(54) MULTI-OUTPUT SWITCHING POWER SUPPLY DEVICE HAVING A STEP-UP/DOWN CONVERTER BETWEEN A STABILIZED OUTPUT AND A NON-STABILIZED OUTPUT

(75) Inventors: Makoto Sato, Niiza (JP); Yoichi Kyono, Niiza (JP)

(73) Assignee: Sanken Electric Co., Ltd., Niiza-Shi, Saitama (JP)

( * ) Notice: Subject to any disclaimer, the term of this patent is extended or adjusted under 35 U.S.C. 154(b) by 246 days.

(21) Appl. No.: 13/145,889

(22) PCT Filed: Dec. 17, 2009

(86) PCT No.: PCT/JP2009/006954
§ 371 (c)(1),
(2), (4) Date: Jul. 22, 2011

(87) PCT Pub. No.: WO2010/086946
PCT Pub. Date: Aug. 5, 2010

(65) Prior Publication Data
US 2011/0278925 A1 Nov. 17, 2011

(30) Foreign Application Priority Data

Feb. 2, 2009 (JP) ................................. 2009-021546
Apr. 6, 2009 (JP) ................................. 2009-092450

(51) Int. Cl.
*H02M 3/335* (2006.01)

(52) U.S. Cl.
USPC ...................................... 363/21.12; 363/21.04

(58) Field of Classification Search
USPC ........................................... 363/21.04, 21.12
See application file for complete search history.

(56) References Cited

U.S. PATENT DOCUMENTS 5,689,407 A * 11/1997 Marinus et al. ............. 363/21.15
5,991,168 A    11/1999 Farrington et al.
7,965,069 B2 * 6/2011 Watanabe et al. ............. 323/284
7,973,524 B1 * 7/2011 He ................................. 323/288
2003/0034760 A1 * 2/2003 Hwang ........................ 323/224
2004/0070376 A1 * 4/2004 Hoshino et al. .............. 323/267

FOREIGN PATENT DOCUMENTS

| CN | 1154766 A | 7/1997 |
| CN | 1497828 A | 5/2004 |
| JP | 57-129131 A | 8/1982 |
| JP | 62-68491 U | 4/1987 |

(Continued)

*Primary Examiner* — Adolf Berhane
*Assistant Examiner* — Emily P Pham
(74) *Attorney, Agent, or Firm* — Birch, Stewart, Kolasch & Birch, LLP

(57) ABSTRACT

In conventional multi-output switching power supply device, power is supplied from a relatively high voltage side output to a relatively low voltage side output through a dropper circuit which generates relatively large power loss so as to improve the voltage accuracy of a non-stabilized output, so that power supply efficiency is low and heat generated from the dropper circuit is high.

One DC power supply of a plurality of DC power supplies on the secondary side is a stabilized output (24 V output terminal TM3) having a voltage stabilizing means for stabilizing the output voltage by feeding back the output voltage to a primary side control circuit 4, and the rest of the DC power supplies are non-stabilized outputs (12 V output terminals TM4) not having a voltage stabilizing means for feeding back the output voltage to the primary side. A step-up/down converter is provided between the output of the non-stabilized output and the output of the stabilized output and power is applied/received between the outputs in accordance with the non-stabilized output voltage and, thus, the voltage accuracy of the non-stabilized output is improved.

7 Claims, 18 Drawing Sheets

(56) References Cited

FOREIGN PATENT DOCUMENTS

| | | |
|---|---|---|
| JP | 3-82367 A | 4/1991 |
| JP | 3-111182 U | 11/1991 |
| JP | 4-25477 U | 2/1992 |
| JP | 4-33571 A | 2/1992 |
| JP | 7-115730 A | 5/1995 |
| WO | WO 96/31940 A1 | 10/1996 |

* cited by examiner

US 8,644,036 B2

MULTI-OUTPUT SWITCHING POWER SUPPLY DEVICE HAVING A STEP-UP/DOWN CONVERTER BETWEEN A STABILIZED OUTPUT AND A NON-STABILIZED OUTPUT

TECHNICAL FIELD

The present invention relates to a multi-output switching power supply device and, more particularly, to a switching power supply device capable of stabilizing, using a means with less power loss, voltage of a non-stabilized output which is not regulated by voltage stabilization feedback control from a secondary side to a primary side.

BACKGROUND ART

In general, a conventional switching power supply having two or more out voltage lines on the secondary side of one transformer has a configuration in which feedback control is performed for a primary side control circuit in order to obtain stable constant voltage at the side at which load power is high, and other output voltages are made to pass through a step-down circuit such as a dropper circuit or chopper circuit for obtaining stable voltages, respectively. However, in the above configuration, it is inevitable that the dropper circuit constantly generates power loss or the chopper circuit generates loss at conversion time.

FIG. 17 illustrates an example of 12 V output current vs. 12 V output voltage characteristics obtained in the case where the secondary side has two outputs of 12 V and 24 V and where 24 V output is set as a stabilized output (hereinafter, output that is fed back to the primary side control circuit is referred to as "stabilized output") and 12 V output is set as a non-stabilized output (the other output that is not fed back to the primary side control circuit is referred to as "non-stabilized output"). FIG. 18 illustrates an example of 24 V output current vs. 12 V output voltage characteristics obtained in the case where the secondary side has two outputs of 12 V and 24 V and where 24 V output is set as the stabilized output and 12 V output is set as the non-stabilized output. Thus, the voltage of 12 V output which is the non-stabilized output varies depending on the load state of 12 V output or 24 V output.

There exists an efficiency-oriented method that improves the winding voltage and structure of a transformer to reduce a variation in a secondary side winding so as to suppress a voltage variation of the non-stabilized output with respect to a current change of the stabilized output. However, the voltage accuracy of the non-stabilized output is worse than that of the stabilized output and, thus, the variation range of output voltage becomes wide. Further, when the current of the stabilized output reaches an overcurrent region, surge voltage occurs in a transformer winding of the non-stabilized output due to influence of leakage inductance existing in the transformer, significantly increasing the voltage of the non-stabilized output. Further, in the case where the non-stabilized output is stabilized by the dropper circuit, the input voltage of the dropper circuit sometimes rises to exceed a maximum rated voltage.

In order to solve the above problems, conventional arts such as Patent Documents 1 to 3 propose a method in which power is supplied from a relatively high voltage side output to a relatively low voltage side output through a dropper circuit so as to improve the voltage accuracy of the non-stabilized output.

CITATION LIST

Patent Document

Patent Document 1: Jpn. Pat. Appln. Laid-Open Publication No. 4-33571
Patent Document 2: Jpn. Pat. Appln. Laid-Open Publication No. 3-82367
Patent Document 3: Jpn. Pat. Appln. Laid-Open Publication No. 57-129131

DISCLOSURE OF THE INVENTION

Problems to be Solved by the Invention

However, in the method of the above conventional arts, power is supplied from a relatively high voltage side output to a relatively low voltage side output through a dropper circuit which generates relatively large power loss so as to improve the voltage accuracy of a non-stabilized output, so that power supply efficiency is low and heat generated from the dropper circuit is high.

Further, in the method of the above conventional arts, the magnitude relationship between voltage of the stabilized output and voltage of the non-stabilized output is restricted. That is, the dropper circuit can operate only under a condition satisfying (voltage of stabilized output)>(voltage of non-stabilized output) in the techniques of Patent Documents 1 and 2 or satisfying (voltage of stabilized output)<(voltage of non-stabilized output) in the technique of Patent Document 3.

Further, the method of the above conventional arts has no effect of suppressing a variation in DC output voltage with respect to a dynamic load change.

In view of the above problems, an object of the present invention is to provide a multi-output switching power supply device capable of improving power supply efficiency and increasing accuracy of DC output voltage.

Means for Solving the Problems

A switching power supply device according to the present invention is a device that converts an AC power supply inputted to a primary side into a plurality of secondary side DC power supplies for output, wherein: one DC power supply of the plurality of DC power supplies is a stabilized output having a voltage stabilizing means for stabilizing the output voltage by feeding back the output voltage to the primary side; the rest of the DC power supplies is non-stabilized outputs not having a voltage stabilizing means for feeding back the output voltage to the primary side; and a converter is provided, which supplies power from the stabilized output when the output voltage of the non-stabilized output falls below a first predetermined voltage, and regenerates power from the non-stabilized output to the stabilized output when the output voltage of the non-stabilized output exceeds a second predetermined voltage.

In the switching power supply device of the present invention, the converter is a step-up/down converter having a step-up converter function and a step-down converter function, and the output voltage of the stabilized output is set higher than the output voltage of the non-stabilized output, the step-up/down converter uses the step-down converter function to step-down the output voltage of the stabilized output to supply power to the non-stabilized output when the output voltage of the non-stabilized falls below the first predetermined voltage, and the step-up/down converter uses the step-up converter function to step-up the output voltage of the non-stabilized output to regenerate power to the stabilized output when the output voltage of the non-stabilized output exceeds the second predetermined voltage.

In the switching power supply device of the present invention, the first and second predetermined voltages are each set within a voltage accuracy range which is defined such that the output voltage accuracy of the non-stabilized output assumes a predetermined accuracy, and the second predetermined voltage is set higher than the first predetermined voltage by a predetermined potential difference.

Further, a switching power supply device according to the present invention is a device that converts an AC power supply inputted to a primary side into a plurality of secondary side DC power supplies for output, wherein one DC power supply of the plurality of DC power supplies is a stabilized output having a voltage stabilizing means for stabilizing the output voltage by feeding back the output voltage to the primary side, the rest of the DC power supplies are non-stabilized outputs not having voltage stabilizing means for feeding back the output voltage to the primary side, and a step-up/down converter having first and second switch elements alternately tuned on/off and a reactor is connected between the stabilized output and the non-stabilized output, and the step-up/down converter applies/receives power between the stabilized output and the non-stabilized output in accordance with the output voltage of the non-stabilized output.

In the switching power supply device of the present invention, the step-up/down converter turns on/off the first and second switch elements with a constant duty ratio corresponding to the ratio between the output voltage of the stabilized output and the output voltage of the non-stabilized output.

In the switching power supply device of the present invention, the step-up/down converter controls the duty ratio between the first and second switch elements such that the output voltage of the non-stabilized output assumes a predetermined voltage.

In the switching power supply device of the present invention, the step-up/down converter has a means for detecting current flowing in the reactor and restricts the current flowing in the reactor by a predetermined current value during the ON periods of the first and second switch elements.

In the switching power supply device of the present invention, the step-up/down converter has a means for detecting current flowing in the reactor and controls the peak value of the current flowing in the reactor during the ON periods of the first and second switch elements such that the output voltage of the non-stabilized output assumes a predetermined voltage.

Advantages of the Invention

According to the present invention, there can be provided a multi-output switching power supply device capable of improving power supply efficiency and increasing accuracy of DC output voltage.

BEST MODE FOR CARRYING OUT THE INVENTION

Embodiments for carrying out the present invention will be described concretely below with reference to the accompanying drawings.

First Embodiment

Figure 1:
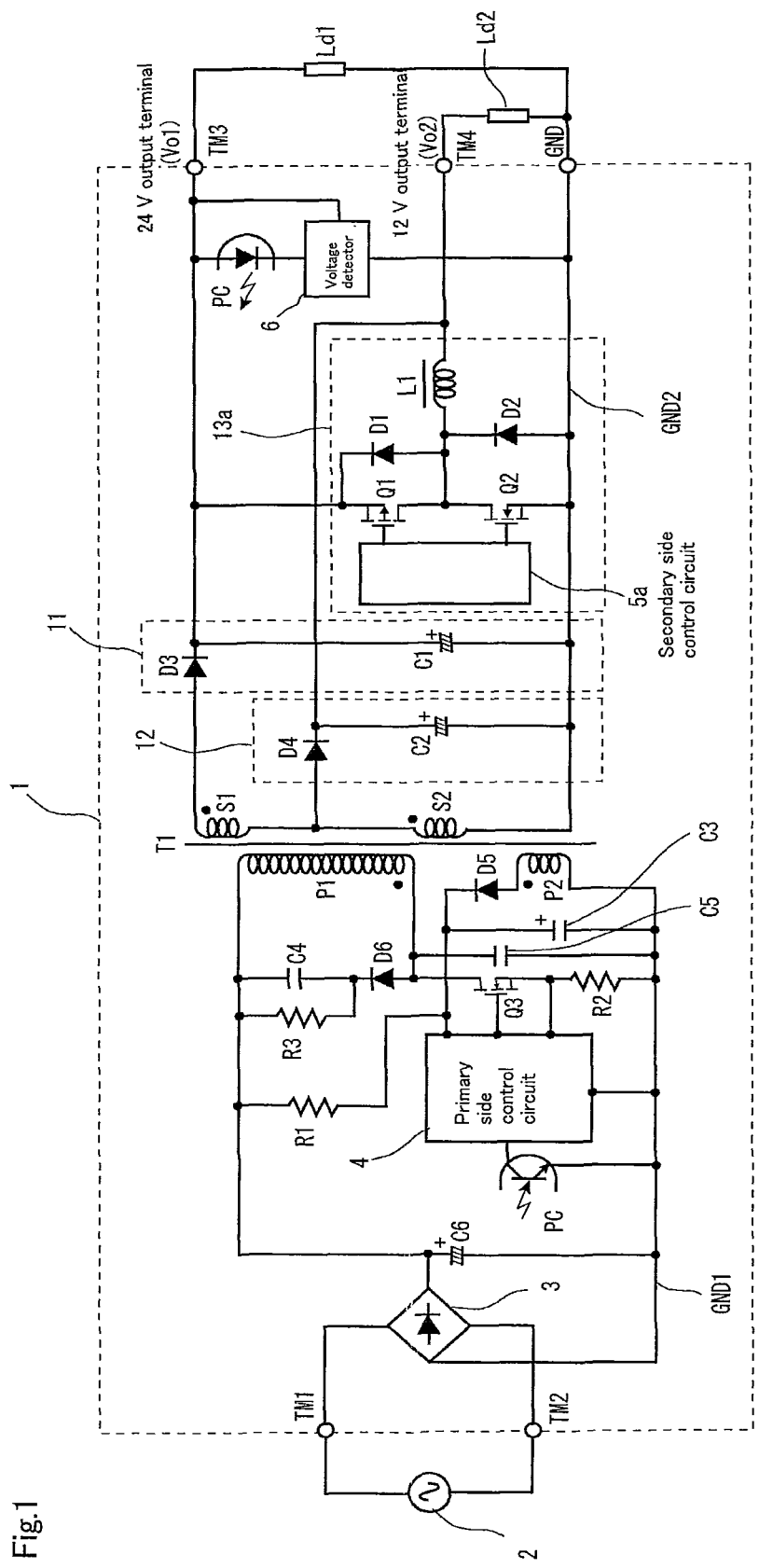
FIG. 1 is a circuit configuration diagram of a switching power supply device according to a first embodiment of the present invention.

FIG. 1 is a configuration diagram of a switching power supply device including a step-up/down converter according to a first embodiment of the present invention.

A power conversion circuit provided in the switching power supply device 1 of FIG. 1 is a flyback converter. However, this is illustrative only, and the power conversion circuit of the switching power supply device 1 is not limited to the flyback converter, but may be any power conversion circuit as long as it can realize multi-output using secondary side winding voltages. Further, as the switching power supply device 1, a multi-output switching power supply device having a 24 V output and a 12 V output on the secondary side in which the 24 V output is set as a stabilized output and 12 V output is set as a non-stabilized output is illustrated. However, this is not intended to limit the configuration of the switching power supply device 1. That is, it is possible to arbitrarily determine which of the outputs is set as the stabilized output or non-stabilized output. As a matter of course, the set voltage of the multi-output is not limited to 12 V or 24 V.

Hereinafter, a circuit configuration of the switching power supply device 1 will be described.

An input terminal TM1 and an input terminal TM2 are provided on the primary side of the switching power supply device 1. The input terminals TM1 and TM2 are connected to an AC power supply 2 such as a single-phase 100 V (50 Hz, 60 Hz) commercial power supply. A 24 V output terminal TM3, a 12 V output terminal TM4, and a GND terminal are provided on the secondary side of the switching power supply device 1. A load Ld1 is connected between the 24 V output terminal TM3 and the GND terminal, and a load Ld2 is connected to between the 12 V output terminal TM4 and the GND terminal.

The AC power supply 2 is connected to a full-wave rectifier bridge 3 through the input terminals TM1 and TM2, and AC voltage of the AC power supply 2 is converted into DC voltage by the full-wave rectifier bridge 3. The pulsation contained in the DC output voltage of the full-wave rectifier bridge 3 is smoothed by a capacitor C6 connected between positive and negative output terminals of the full-wave rectifier bridge 3 into DC voltage with little pulsation.

The switching power supply device 1 includes a transformer T1 having a primary winding P1, secondary windings S1 and S2, and a tertiary winding P2. The positive output terminal of the full-wave rectifier bridge 3 is connected to one terminal of the primary winding P1 of the transformer T1, and the other terminal of the primary winding P1 is connected to the drain terminal of a MOSFET Q3 serving as a switch element. The source terminal of the MOSFET Q3 is connected to the negative output terminal (hereinafter, a line connected to the negative output terminal of the full-wave rectifier bridge 3 is referred to as a ground potential GND1) of the full-wave rectifier bridge 3 through a resistor R2. A capacitor C5 is connected between the other terminal of the primary winding P1 and the ground potential GND1. Further, a series combination obtained by connecting in series a parallel combination of resistor R3 and a capacitor C4 and a diode D6 whose forward direction is directed from the other terminal of the primary winding P1 to the one terminal thereof is connected between the both terminals of the primary winding P1.

One terminal of the secondary winding S1 of the transformer T1 is connected to the anode terminal of a diode D3, and the cathode terminal of the diode D3 is connected to the 24 V output terminal TM3. One terminal of a capacitor C1 is connected between the cathode terminal of the diode D3 and the 24 V output terminal TM3, and the other terminal thereof is connected to an output ground terminal GND (hereinafter, a line connected to the output ground terminal GND is referred to as a ground potential GND2) of the switching power supply device 1. The other terminal of the secondary winding S1 of the transformer T1 and the one terminal of the secondary winding S2 are connected to each other, and the other terminal of the secondary winding S2 is connected to the ground potential GND2. As described above, the secondary windings S1 and S2 of the transformer T1 are connected in series to be connected to a rectification smoothing circuit 11 including the diode D3 and the capacitor C1, thereby outputting 24 V DC voltage to the 24 V output terminal TM3.

The other terminal of the secondary winding S1 of the transformer T1 and the one terminal of the secondary winding S2 are connected to each other. A tap is taken from the connection point and is connected to the anode terminal of a diode D4. The cathode terminal of the diode D4 is connected to the 12 V output terminal TM4. One terminal of a capacitor C2 is connected between the cathode terminal of the diode D4 and the 12 V output terminal TM4, and the other terminal of the capacitor C2 is connected to the ground potential GND2. As described above, the secondary winding S2 of the transformer T1 is connected to a rectification smoothing circuit 12 composed of the diode D4 and the capacitor C2, thereby outputting 12 V DC voltage to the 12 V output terminal TM4.

A primary side control circuit 4 is a control circuit that controls a power conversion circuit constituted by the transformer T1, MOSFET Q3, and the like, that is, a flyback converter. A power supply for the primary side control circuit 4 is created by the tertiary winding P2 of the transformer T1, a diode D5, a capacitor C3, a starting resistor R1, and the like and is supplied to the primary side control circuit 4.

The voltage of the secondary side 24 V output is fed back to the primary side control circuit 4 so as to stabilize the voltage of the 24 V output. That is, a series combination of the light-emission side of a photocoupler PC and a voltage detector 6 is connected between the 24 V output terminal and the ground potential GND2, and the light-reception side of the photocoupler PC is connected between a control input terminal of the primary side control circuit 4 and the ground potential GND1.

A step-up/down converter 13a for stabilizing a non-stabilized output is connected to the 24 V output and 12 V output. That is, the source terminal of a switch element Q1 (P-type MOSFET) is connected to the connection point of the diode D3 and the 24 V output terminal TM3, the drain terminal of the switch element Q1 is connected to the drain terminal of a switch element Q2 (N-type MOSFET), and the source terminal of the switch element Q2 is connected to the ground potential GND2. Further, diodes D1 and D2 are connected in reverse parallel with the switch element Q1 and switch element Q2, respectively, so as to cause current to flow in the reverse direction to the current direction of the switch elements Q1 and Q2. Further, one terminal of a reactor L1 is connected to the connection point at which the drain terminal of the switch element Q1 and the drain terminal of the switch element Q2 are connected to each other, and the other end of the reactor L1 is connected to the 12 V output terminal TM4. Control terminals of a secondary side control circuit 5a that ON/OFF controls the switch elements Q1 and Q2 are connected to the gate terminals of the switch elements Q1 and Q2.

Next, operation of the switching power supply device 1 of the present embodiment having the configuration as described above will be described. The switching power supply device 1 of the present embodiment has a feature in the step-up/down converter 13a, and the portions other than the step-up/down converter 13a are the same as those in a power conversion circuit using a well-known flyback converter, so that details of the operation are omitted here.

First, characteristics of the 12 V output and 24 V output in the case where the step-up/down converter 13a is not connected (i.e., in the case of the conventional art) will be described.

Figure 2:
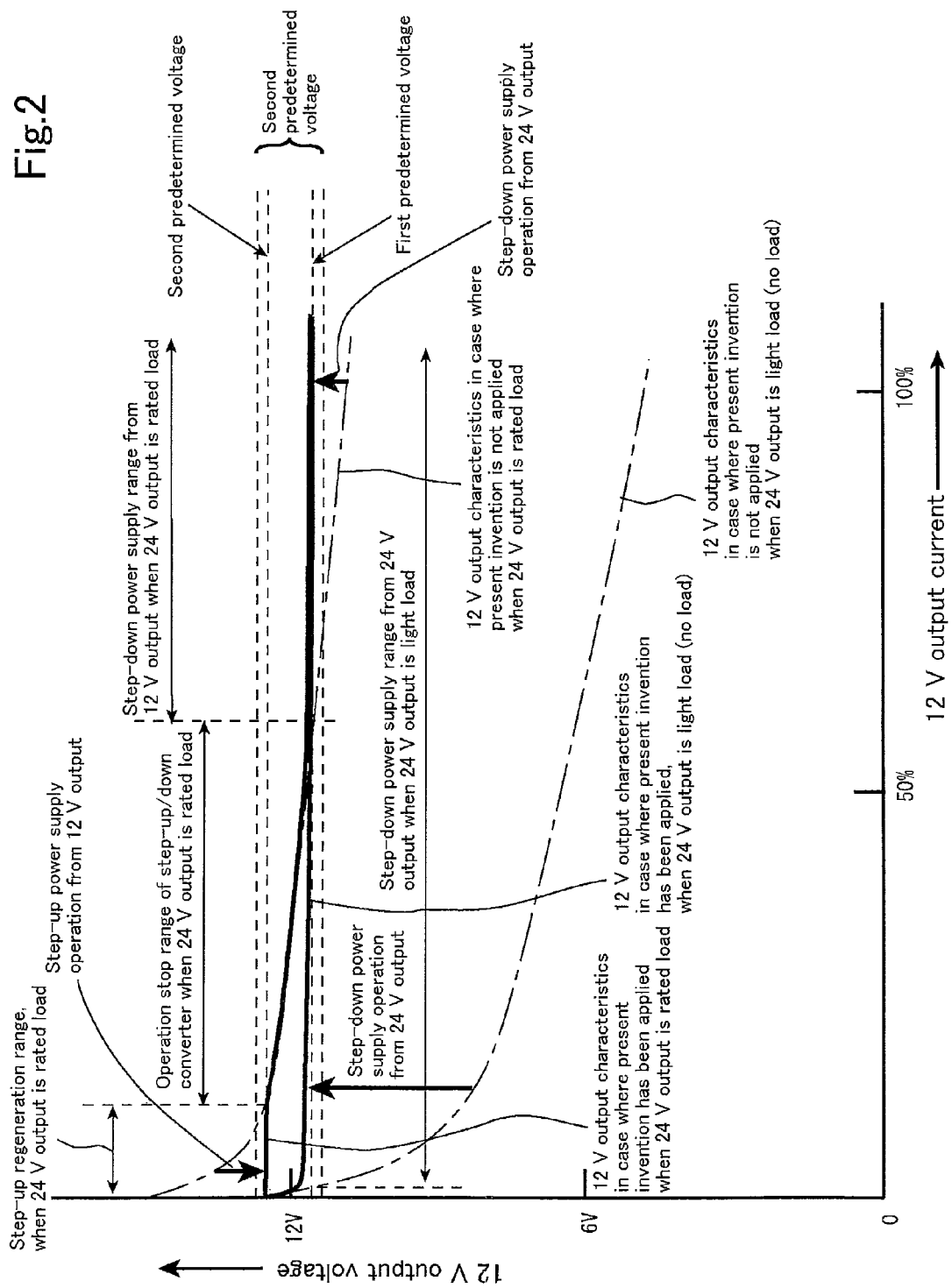
FIG. 2 is a view for explaining output voltage characteristics of the switching power supply device according to the embodiment of the present invention.
Figure 17:
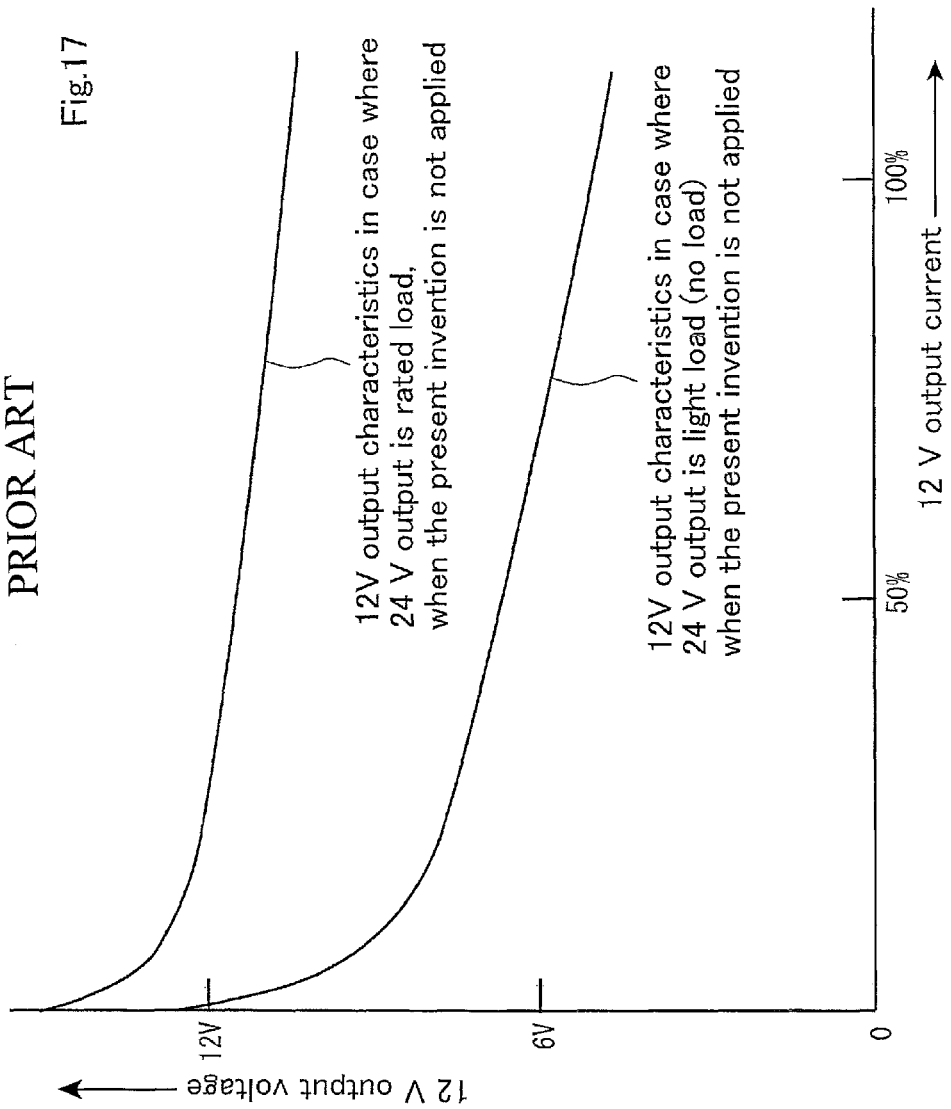
FIG. 17 is a view for explaining output voltage characteristics of a switching power supply device according to a conventional art.
Figure 18:
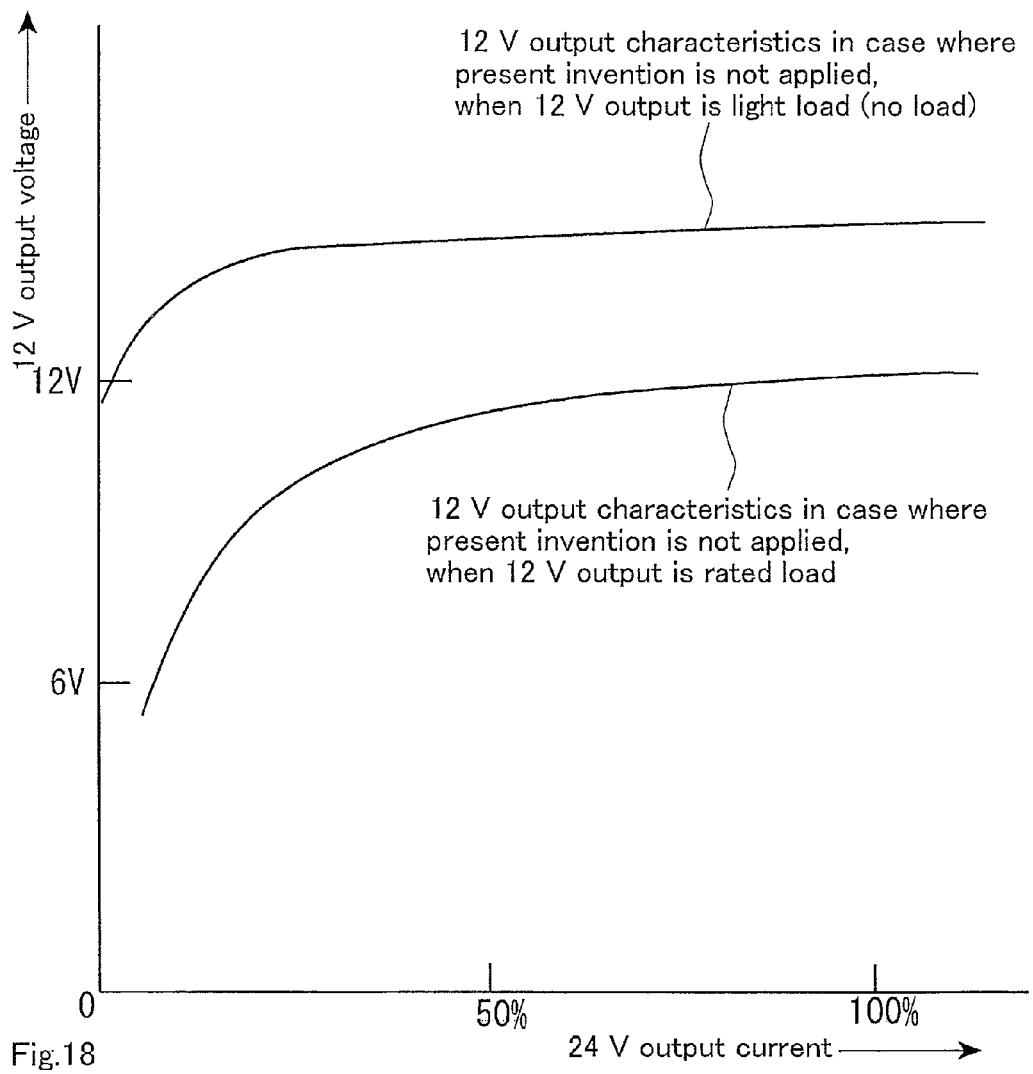
FIG. 18 is a view for explaining output voltage characteristics of a switching power supply device according to a conventional art.

In FIG. 2, thin dash-dotted lines denote the voltage characteristics of the 12 V output which are the same as the characteristics illustrated in FIG. 17. The voltage characteristics of the upper side 12 V output is the 12 V output voltage characteristics with respect to 12 V output current when the 24 V output is rated load. The voltage characteristics of the lower side 12 V output is the 12 V output voltage characteristics with respect to 12 V output current when the 24 V output is light load (or no load). As illustrated, the 12 V output voltage exhibits characteristics in which it decreases with an increase in the 12 V output current under the condition that the 24 V output current is constant. Further, the 12 V output voltage exhibits characteristics in which it is influenced by a load state of the 24 V output and decreases as the load state of the 24 V output is changed from rated load to no load as illustrated in FIG. 18.

As described above, even if the 12 V output current is constant, output voltage of the 12 V output significantly changes depending on the load state of the 24 V output. That is, so called cross regulation characteristics become prominent. For example, in the example of FIG. 2, the 12 V output voltage at the time when the 24 V output is rated load current increases up to about 14 V at the time when the output current is 0% and decreases to about 10 V to 11 V at the time when the output current is 100%. Assuming that the voltage accuracy of the 12 V output voltage is set within 5% (11.4 V to 12.6 V), the accuracy is not satisfied at all.

Next, operation of the switching power supply device 1 of FIG. 1 in which the step-up/down converter 13a is connected between the 24 V output line and 12 V output line in order to apply the present invention will be described.

In FIG. 2, the characteristics of two solid lines denote the voltage characteristics of the 12 V output to which the present invention has been applied. The characteristics of the upper side solid line is the 12 V output voltage characteristics with respect to 12 V output current when the 24 V output is rated load, and the characteristics of the lower side solid line is the 12 V output voltage characteristics with respect to 12 V output current when the 24 V output is light load (or no load).

Although the function of the step-up/down converter 13a will be described later in detail, when the 12 V output voltage decreases to a first predetermined voltage (a first predetermined voltage set within a voltage accuracy range defined by dotted lines of FIG. 2) or less, power is supplied from the 24 V output line to the 12 V output line through a step-down process (step-down converter function of the step-up/down converter 13a) so as to compensate for power deficiency, which will also be described later in detail with reference to FIG. 5. This operation is denoted by upward arrows of FIG. 2.

When the 12 V output voltage increases to a second predetermined voltage (a second predetermined voltage set within a voltage accuracy range defined by dotted lines of FIG. 2) or more, excess power is raised from the 12 V output line to 24 V output line for regeneration (step-up converter function of the step-up/down converter 13a), which will also be described later in detail with reference to FIG. 6. This operation is denoted by a downward arrow of FIG. 2.

As illustrated in FIG. 2, it is assumed that the first predetermined voltage and second predetermined voltage are included in the 12 V output voltage accuracy and that the second predetermined voltage is set higher than the first predetermined voltage by a predetermined potential difference. According to the present embodiment, it is possible to make the 12 V output voltage accuracy fall within a required voltage accuracy, e.g., 5% by the action of the step-up/down converter 13a.

The selection of the ratio between the number of windings of the secondary windings S1 and S2 will be described. The rectification smoothing circuit 12 previously selects the ratio S1:S2 between the number of windings of the secondary windings S1 and S2 of the transformer T1 such that the 12 V output voltage outputs a voltage slightly below 12 V, e.g., 11 V under the condition that the 24 V output is rated load and the 12 V output is rated load. Alternatively, the rectification smoothing circuit 12 previously selects the ratio S1:S2 between the number of windings of the secondary windings S1 and S2 of the transformer T1 such that the maximum value of the 12 V output voltage does not exceed an upper limit value specified by the voltage accuracy of the 12 V output under the minimum load condition that the 24 V output is light load or no load.

Figure 3:
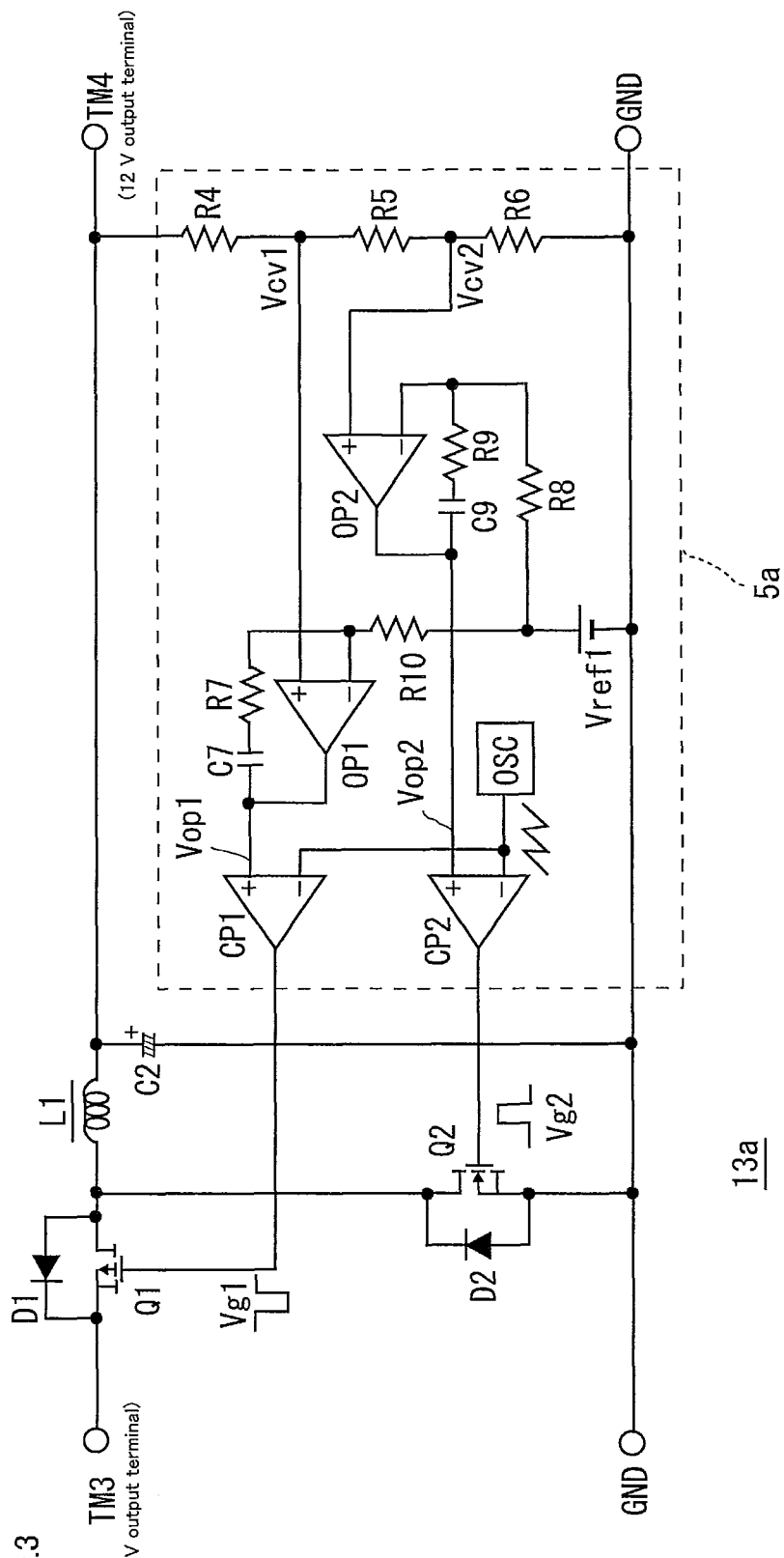
FIG. 3 is a circuit configuration diagram of a step-up/down converter in the switching power supply device according to the first embodiment of the present invention.

FIG. 3 is a view illustrating a more detailed configuration of the step-up/down converter 13a and the secondary side control circuit 5a that performs control in the step-up/down converter 13a so as to stabilize the 12 V output. In FIG. 3, a portion surrounded by a dotted frame corresponds to the secondary side control circuit 5a. The secondary side control circuit 5a is constituted by operational amplifiers OP1 and OP2, comparators CP1 and CP2, a reference voltage Vref1, a triangle wave oscillator OSC, resistors R4 to R10, capacitors C7 and C9, and the like.

The resistors R4, R5, and R6 are connected in series between the 12 V output terminal TM4 and the ground terminal GND. Thus, voltage Vcv1 at the connection point of the resistors R4 and R5 corresponds to voltage obtained by dividing the voltage of the 12 V output in a ratio of (R4):(R5+R6), and voltage Vcv2 at the connection point of the resistors R5 and R6 corresponds to voltage obtained by dividing the voltage of the 12 V output in a ratio of (R4+R5):(R6). The connection point of the resistors R4 and R5 is connected to the non-inverting input terminal of the operational amplifier OP1, and the connection point of the resistors R5 and R6 is connected to the non-inverting input terminal of the operational amplifier OP2.

The reference voltage Vref1 is input to the inverting input terminals of the operational amplifiers OP1 and OP2 through the resistors R8 and R10, respectively. A series combination of the resistor R7 and capacitor C7 is connected between the output terminal and inverting input terminal of the operational amplifier OP1 as a negative feedback impedance, and a series combination of the resistor R9 and capacitor C9 is connected between the output terminal and inverting input terminal of the operational amplifier OP2 as a negative feedback impedance. The output terminal of the operational amplifier OP1 is connected to the non-inverting input terminal of the comparator CP1, and the output terminal of the operational amplifier OP2 is connected to the non-inverting input terminal of the comparator CP2.

A signal from the triangle wave oscillator OSC is input to the inverting input terminals of the comparators CP1 and CP2. The output terminal of the comparator CP1 is connected to the gate terminal of the switch element Q1, and the output terminal of the comparator CP2 is connected to the gate terminal of the switch element Q2.

In the configuration of the step-up/down converter 13a, a circuit constructed as a step-down converter is constituted by the switch element Q1, diode D2 connected in reverse parallel with the switch element Q2, reactor L1, and capacitor C2.

In the configuration of the step-up/down converter 13a, a circuit constructed as a step-up converter is constituted by the switch element Q2, diode D1 connected in reverse parallel with the switch element Q1, reactor L1, and capacitor C2.

The switching of the operation of step-up/down converter is performed by the operational amplifiers OP1 and OP2 and comparators CP1 and CP2.

When the voltage of the 12 V output decreases to the first predetermined voltage set within the voltage accuracy range illustrated in FIG. 2 or less, the step-up/down converter 13a detects the decrease in the voltage and operates so as to supply power from the 24 V output to the 12 V output to restore the voltage of the 12 V output. The 12 V output receives power from the 24 V output and the voltage level thereof is restored to the first predetermined voltage. The operation of the step-up/down converter 13a functioning as the step-down converter will be described in detail below.

Figure 4:
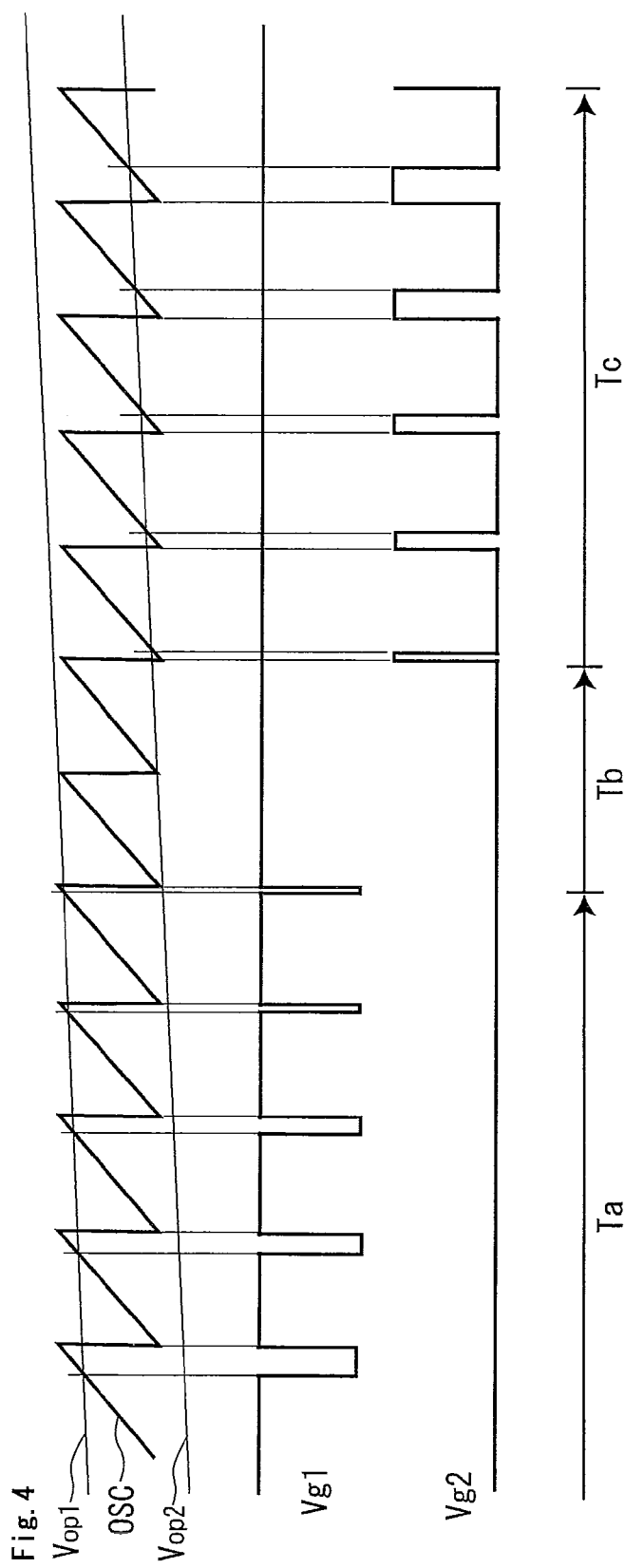
FIG. 4 is a view for explaining operation of the step-up/down converter in the switching power supply device according to the first embodiment of the present invention.

As illustrated in FIG. 3, voltage at the connection point of the resistors R4 and R5 is obtained, as the voltage Vcv1 obtained by dividing the voltage of the 12 V output in a ratio of (R4):(R5+R6) by the resistors R4, R5, and R6 connected in series between the 12 V output terminal TM4 and the ground terminal GND. A difference between the voltage Vcv1 and reference voltage Vref1 is calculated by the operational amplifier OP1 and the calculated difference becomes an output Vop1 of the operational amplifier OP1. The output Vop1 of the operational amplifier OP1 is then input to the non-inverting input terminal of the comparator CP1 and compared to a triangle wave signal input thereto from the triangle wave oscillator OSC. The Vop1 and OSC during a time period Ta of FIG. 4 illustrate a relationship between the output Vop1 of the operational amplifier OP1 and signal voltage of the triangle wave oscillator OSC. The comparator CP1 turns its output signal Vcp1 into a low level signal and turns a gate signal Vg1 of the switch element Q1 into an ON signal (low level signal) in a time period during which the output Vop1 of the operational amplifier OP1 is lower than the triangle wave signal OSC. This operating waveform is illustrated as a signal waveform Vg1 during a time period Ta of FIG. 4. When the voltage of the 12 V output gradually increases, the output Vop1 of the operational amplifier OP1 further increases, resulting in absence of a time period during which the output Vop1 and triangle wave signal OSC cross each other. In this state, the output Vcp1 of the comparator CP1 is fixed to a high level, and the gate signal Vg1 (=output Vcp1 of the comparator CP1) of the switch element Q1 is kept at an OFF signal (high level signal) (time period Tb and time period Tc).

Figure 5:
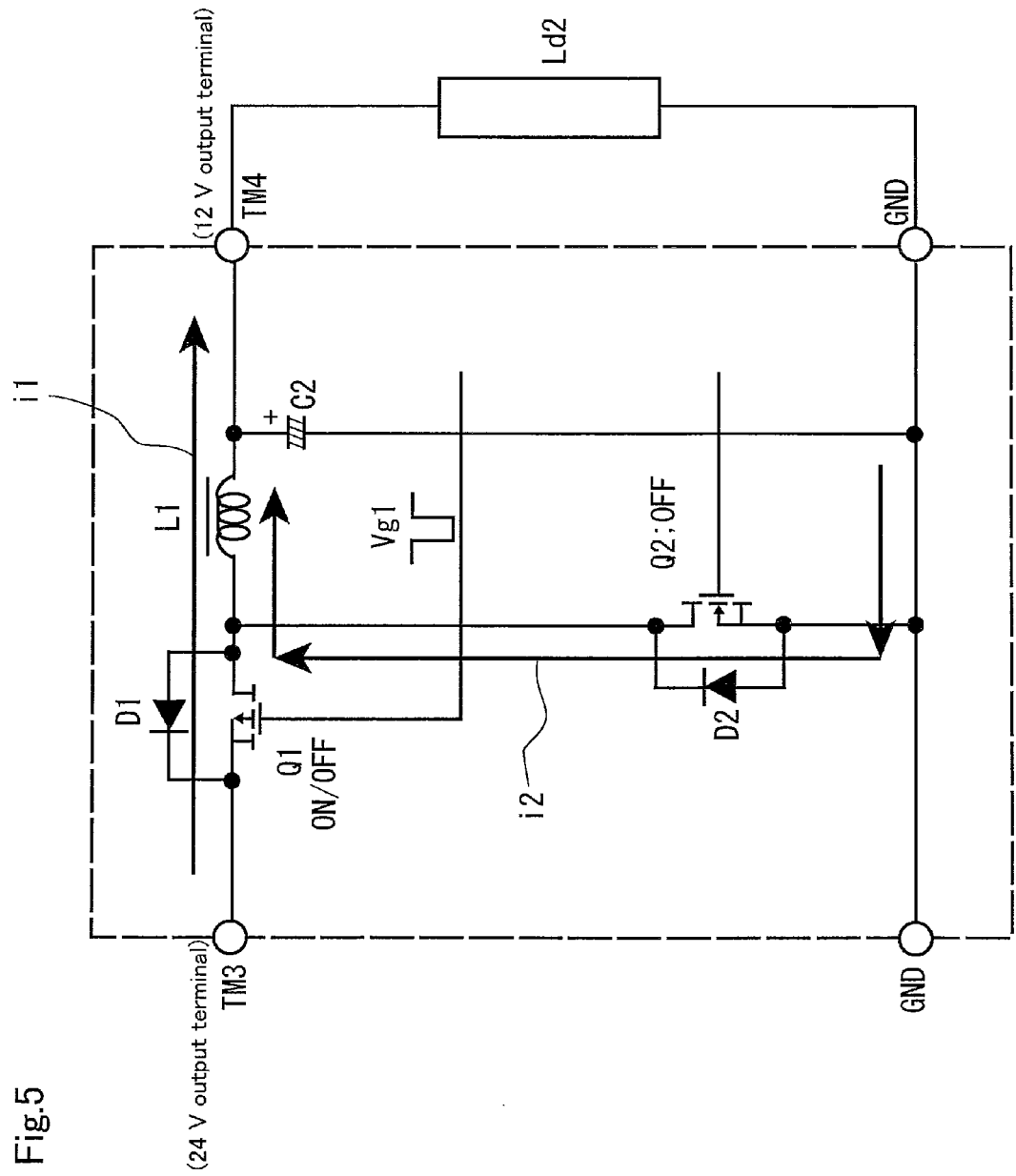
FIG. 5 is a view for explaining a step-down operation of the step-up/down converter in the switching power supply device according to the first embodiment of the present invention.

In the step-down converter of the step-up/down converter 13a, when the output signal Vg1 of the comparator CP1 in FIG. 3 is supplied to the gate of the switch element Q1 as an ON signal (low level signal), the switch element Q1 is turned on to cause current to flow from the 24 V output to the load Ld2 through the switch element Q1, reactor L1, and 12 V output terminal TM4 like current i1 of FIG. 5, whereby power is supplied from the 24 V output to 12 V output. When the output signal Vg1 of the comparator CP1 of FIG. 3 is supplied to the gate of the switch element Q1 as an OFF signal (high level signal), the switch element Q1 is turned off to cause the current it flowing in the reactor L1 to flow as circulation current through the reactor L1, load Ld2, and diode D2 like i2 of FIG. 5. At this time, the switch element Q2 is kept at an OFF state. The percentage of ON-period of the switch element Q1 relative to one cycle of the triangle wave signal OSC increases as the voltage of the 12 V output decreases, so that the step-down converter operates such that the percentage of power supplied from the 24 V output to 12 V output increases.

When the voltage of the 12 V output exceeds the second predetermined voltage set within the voltage accuracy range of FIG. 2, the step-up/down converter 13a detects the increase in the voltage and regenerates power from the 12 V output to the 24 V output side in order to restore the voltage of the 12 V output so as to decrease the voltage of the 12 V output to the second predetermined voltage. The 12 V output is regenerated to the 24 V output for power supply and the voltage level thereof is restored to the second predetermined voltage. The operation of the step-up/down converter 13a functioning as the step-up converter will be described in detail below.

As illustrated in FIG. 3, voltage at the connection point of the resistors R5 and R6 is obtained, as the voltage Vcv2 obtained by dividing the voltage of the 12 V output in a ratio of (R4+R5):(R6) by the resistors R4, R5, and R6 connected in series between the 12 V output terminal TM4 and the ground terminal GND. A difference between the voltage Vcv2 and the reference voltage Vref1 is calculated by the operational amplifier OP2 and the calculated difference becomes an output Vop2 of the operational amplifier OP2. The output Vop2 of the operational amplifier OP2 is then input to the non-inverting input terminal of the comparator CP2 and compared to a triangle wave signal input thereto from the triangle wave oscillator OSC. The Vop2 and OSC during a time period Tc of FIG. 4 illustrate a relationship between the output Vop2 of the operational amplifier OP2 and signal voltage of the triangle wave oscillator OSC. The comparator CP2 turns its output signal Vcp2 into a high level signal and turns a gate signal Vg2 of the switch element Q2 into an ON signal (high level signal) in a time period during which the output Vop2 of the operational amplifier OP2 is higher than the triangle wave signal OSC. This operating waveform is illustrated as a signal waveform Vg2 during a time period Tc of FIG. 4. When the voltage of the 12 V output gradually increases, the output Vop2 of the operational amplifier OP2 increases, resulting in an increase in a time period during which the output Vop2 and triangle wave signal OSC cross each other. The output Vcp2 of the comparator CP2 outputs high level voltage in a time period during which the output Vop2 of the operational amplifier OP2 and the triangle wave signal OSC cross each other, so that an ON signal which is the gate signal Vg2 of the switch element Q2 is outputted.

During the time period Ta and time period Tb illustrated in FIG. 4, the output Vop2 of the operational amplifier OP2 and triangle wave signal OSC do not cross each other at all, and the gate signal Vg2 of the switch element Q2 is kept at an OFF signal (low level signal).

Figure 6:
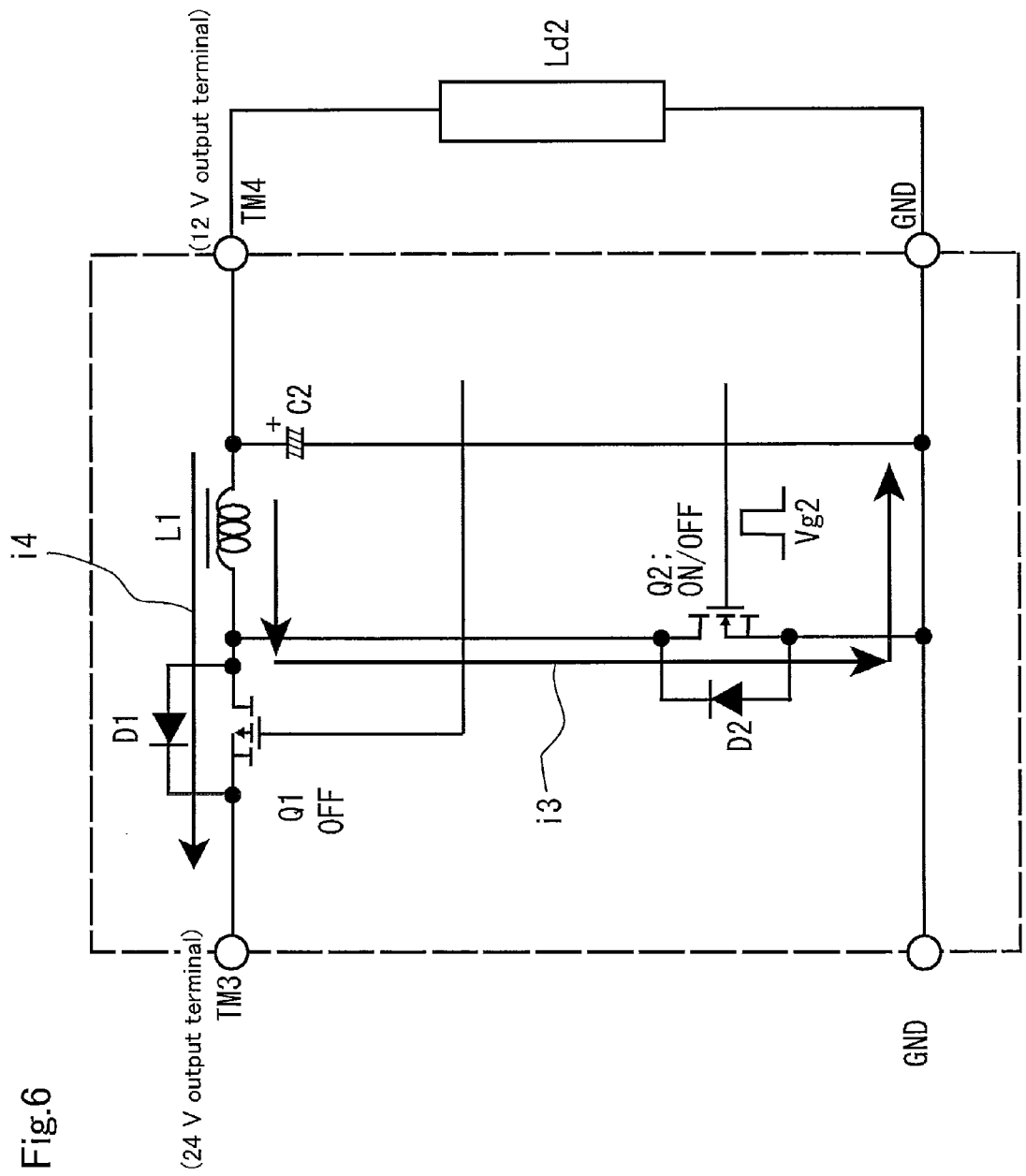
FIG. 6 is a view for explaining a step-up operation of the step-up/down converter in the switching power supply device according to the first embodiment of the present invention.

In the step-up converter of the step-up/down converter 13a, when the output signal Vg2 of the comparator CP2 in FIG. 3 is supplied to the gate of the switch element Q2 as an ON signal (high level signal), the switch element Q2 is turned on to cause current to flow from the 12 V output in a loop including the reactor L1 and the switch element Q2 like current i3 of FIG. 6. When the output signal Vg2 of the comparator CP2 of FIG. 3 is supplied to the gate of the switch element Q2 as an OFF signal (low level signal), the switch element Q2 is turned off to cause the current flowing in the reactor L1 to flow through the load Ld2, reactor L1, and diode D1 like current i4 of FIG. 6, with the result that the current of 12 V output flows in the 24 V output side as regeneration current. At this time, the switch element Q1 is kept at an OFF state. The percentage of ON-period of the switch element Q2 relative to one cycle of the triangle wave signal OSC increases as the voltage of the 12 V output increases, so that the step-up converter operates such that the percentage of power regenerated from the 12 V output to the 24 V output increases.

As described above, the switching of the operation of step-up/down converter is performed in a range between the input voltages Vcv1 and Vcv2 of the operational amplifiers OP1 and OP2. There exists a potential difference between the Vcv1 and Vcv2, the step-up converter operation and step-down converter operation are not performed at the same time. Further, although the voltage level is different, the voltages Vcv1 and Vcv2 correspond to the first and second predetermined voltages in FIG. 3, respectively.

The time period Tb in FIG. 4 is a time period during which neither the switch elements Q1 and Q2 perform ON/OFF operation.

In general, in the stabilized output, the feedback to the primary side allows stable voltage to be obtained; however, feedback control delays with respect to a change in the dynamic load in which a load changes suddenly and, thus, voltage transiently drops. The present embodiment works well also for the voltage drop and can reduce the voltage drop.

Figure 7:
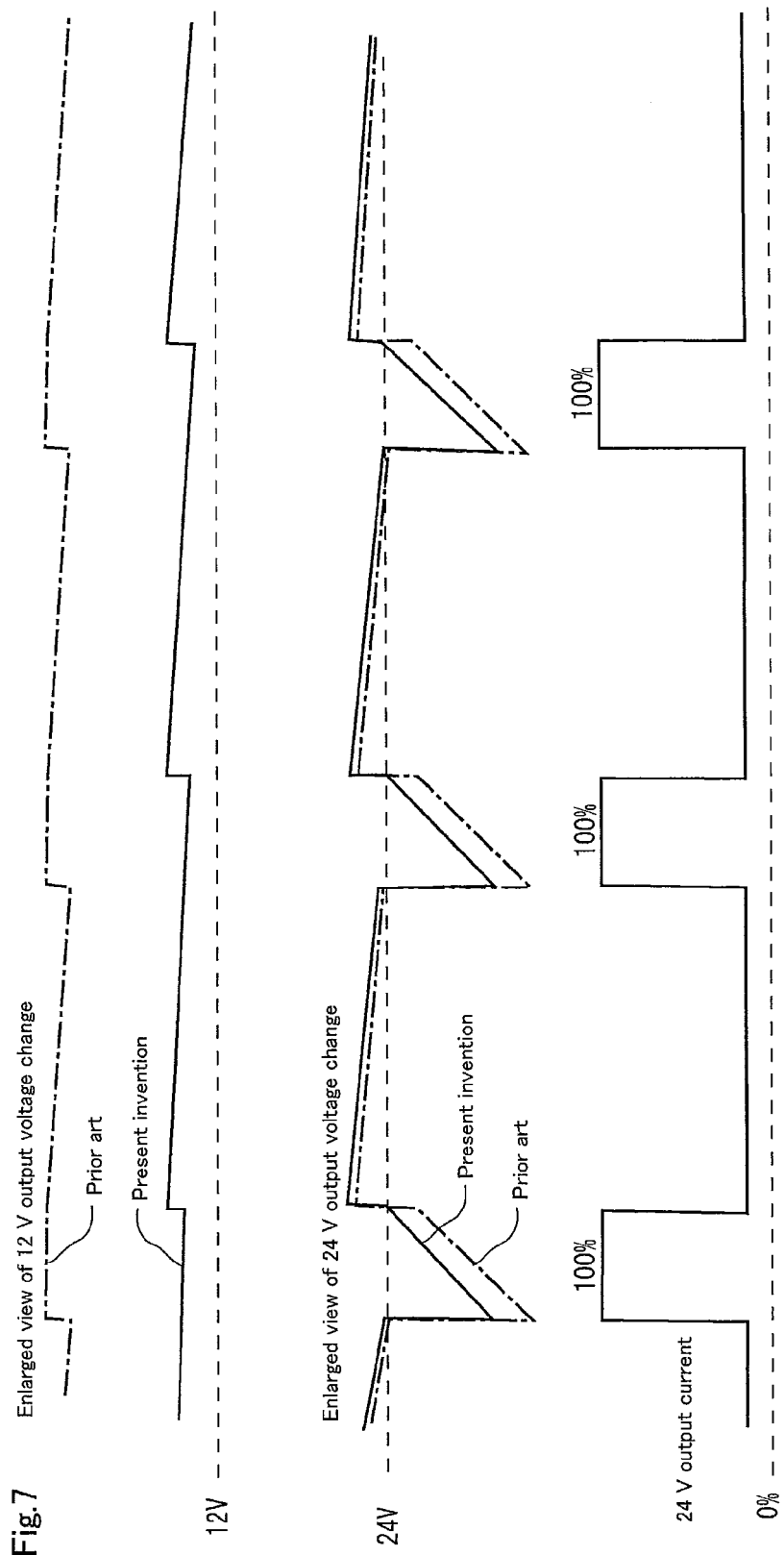
FIG. 7 is a view for explaining an output voltage variation at the time of a dynamic load change in the switching power supply device according to the first embodiment of the present invention.

According to the present embodiment, in the case of a change in the dynamic load, the voltage dip of the 24 V output voltage can be improved, and the voltage accuracy due to influence of the cross regulation can be improved by voltage regeneration on the 12 V output voltage to the 24 V output. FIG. 7 illustrates changes in the 12 V output voltage and 24 V output voltage obtained when the 24 V output current is changed from light load (about 10%) to rated load (100%) in a stepwise fashion in both the switching power supply device 1 (present embodiment to which the present invention has been applied) and the conventional art (switching power supply device not having the step-up/down converter 13a in FIG. 1) to which the present invention is not applied. As is clear from FIG. 7, the transient voltage drop of the 24 V output voltage due to a sudden change in the load has been improved. Further, surplus power of the 12 V output voltage has nowhere to go at the time point when the 24 V load has become light load, so that the 12 V output voltage slightly increases; however, the power is regenerated on the 12 V output voltage to the 24 V output, thereby improving the degradation in the voltage accuracy due to influence of the cross regulation.

Second Embodiment

A second embodiment according to the present invention will be described. The switching power supply device 1 of the present embodiment has a step-up/down converter 13b of FIG. 8 in place of the step-up/down converter 13a of FIG. 1. The switch element Q1 in the step-up/down converter 13a of the first embodiment is a P-type MOSFET, while a switch element Q21 of the present embodiment corresponding to the switch element Q1 is an N-type MOSFET. That is, the drain terminal of the switch element Q21 is connected to the connection point of the diode D3 and the 24 V output terminal TM3, the source terminal of the switch element Q21 is connected to the drain terminal of the switch element Q2, and the source terminal of the switch element Q2 is connected to the ground potential GND. Further, the diodes D1 and D2 are connected in reverse parallel with the switch element Q21 and the switch element Q2, respectively, so as to cause current to flow in the reverse direction to the current direction of the switch elements Q21 and Q2. The diodes D1 and D2 may be replaced by parasitic diodes of the switch elements Q21 and Q2, respectively. One terminal of the reactor L1 is connected to the connection point of the source terminal of the switch element Q21 and the drain terminal of the switch element Q2, and the other terminal of the reactor L1 is connected to the 12 V output terminal TM4. Control terminals of a secondary side control circuit 5b that ON/OFF controls the switch elements Q21 and Q2 are connected to the gates of the switch elements Q21 and Q2. The secondary side control circuit 5b of the present embodiment is different in configuration from the secondary side control circuit 5a of the first embodiment. Also in the second embodiment, it is possible to use a p-type MOSFET as the switch element Q21 by logic recombination.

In the present embodiment, although details will be described later with reference to FIG. 11, when the ratio of the 12 V output voltage relative to the 24 V output voltage decreases, the step-up/down converter 13b supplies power from the 24 V output line to the 12 V output line through a step-down process so as to compensate for power deficiency (step-down converter function of the step-up/down converter 13b). This operation is denoted by upward arrows of FIG. 2.

Although details will be described later with reference to FIG. 12, when the ratio of the 12 V output voltage relative to the 24 V output voltage increases, the step-up/down converter 13b raises excess power from the 12 V output line to the 24 V output line for supply (step-up converter function of the step-up/down converter 13b). This operation is denoted by a downward arrow of FIG. 2.

According to the present embodiment, it is possible to make the 12 V output voltage accuracy fall within a required voltage accuracy, e.g., 5% by the action of the step-up/down converter 13b.

Figure 8:
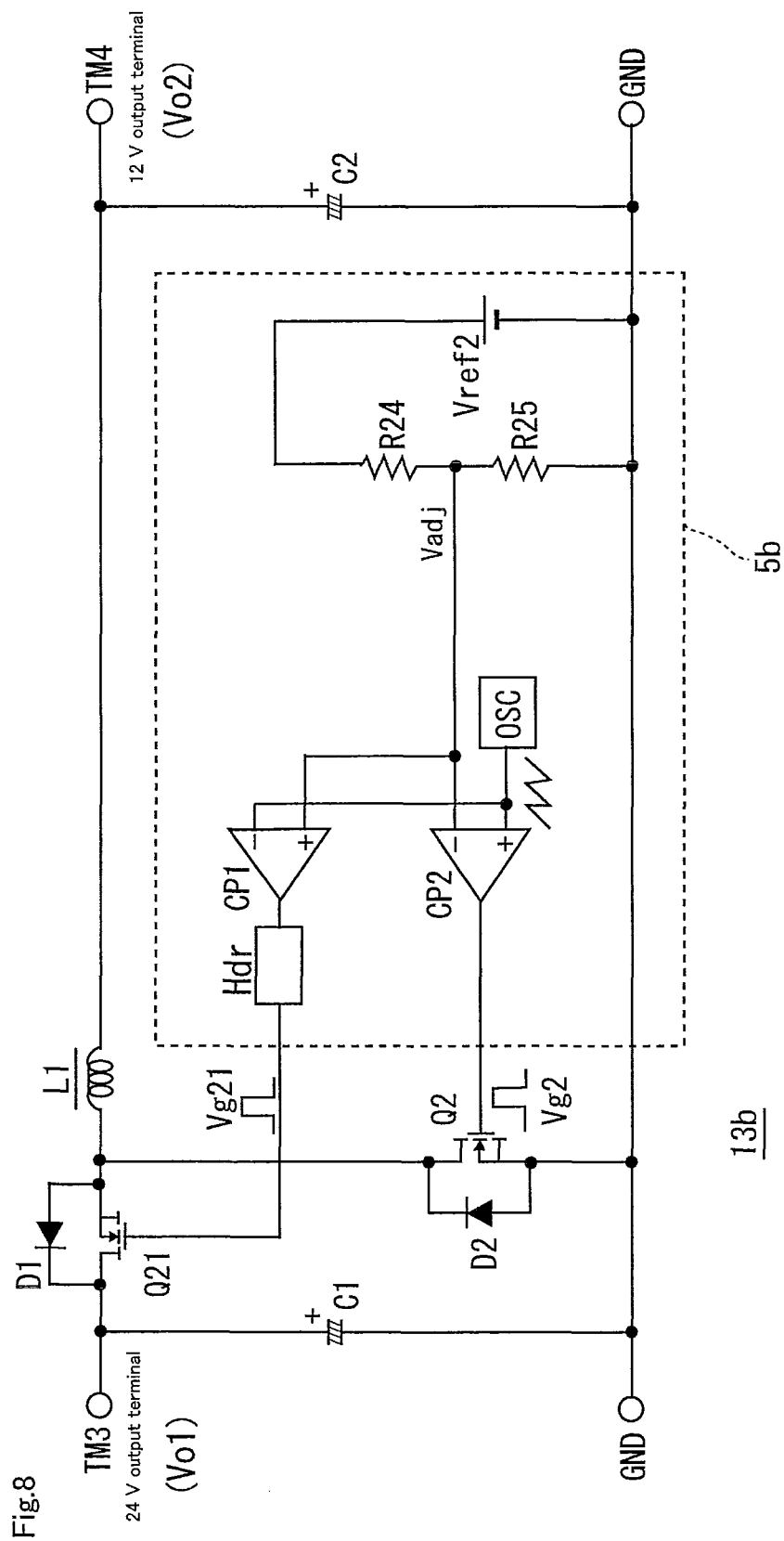
FIG. 8 is a basic circuit configuration diagram of a step-up/down converter in a switching power supply device according to a second embodiment of the present invention.

FIG. 8 is a view illustrating a detailed configuration of the step-up/down converter 13b and the secondary side control circuit 5b that performs ON/OFF control for the switch element Q21 and switch element Q2 in the step-up/down converter 13b. In FIG. 8, a portion surrounded by a dotted frame corresponds to the secondary side control circuit 5b. The secondary side control circuit 5b is constituted by comparators CP1 and CP2, a reference voltage Vref2, a triangle wave oscillator OSC, resistors R24 and R25, a driver Hdr, and the like.

Although not illustrated, it is preferable to provide a circuit having a dead-time period during which the switch elements Q21 and Q2 are not turned on at the same time in their ON/OFF switching time in the ON/OFF control of the switch elements Q21 and Q2.

The resistors R24 and R25 are connected in series to both terminals of the reference voltage Vref2. Thus, voltage Vadj at the connection point of the resistors R24 and R25 corresponds to voltage obtained by dividing the voltage of the reference voltage Vref in a ratio of R24:R25. The connection point of the resistors R24 and R25 is connected to the non-inverting input terminal of the comparator CP1 and inverting input terminal of the comparator CP2.

A signal from the triangle wave oscillator OSC is input to the inverting input terminal of the comparator CP1 and non-inverting input terminal of the comparator CP2. The output terminal of the comparator CP1 is connected to the gate terminal of the switch element Q21 through a driver Hdr that level-shifts a signal output from the comparator CP1 to a signal based on the source terminal of the switch element Q21, and the output terminal of the comparator CP2 is connected to the gate terminal of the switch element Q2.

Operation of the secondary side control circuit 5b will be described in detail below.

As illustrated in FIG. 8, voltage at the connection point of the resistors R24 and R25 is obtained, as the voltage Vadj obtained by dividing the reference voltage Vref2 in a ratio of R24:R25 by the resistors R24 and R25 connected in series between the reference voltage Vref2 and the ground potential GND. The obtained voltage is then inputted to the non-inverting input terminal of the comparator CP1 and inverting input terminal of the comparator CP2 for comparison to a triangle wave signal input thereto from the triangle wave oscillator OSC.

Figure 9:
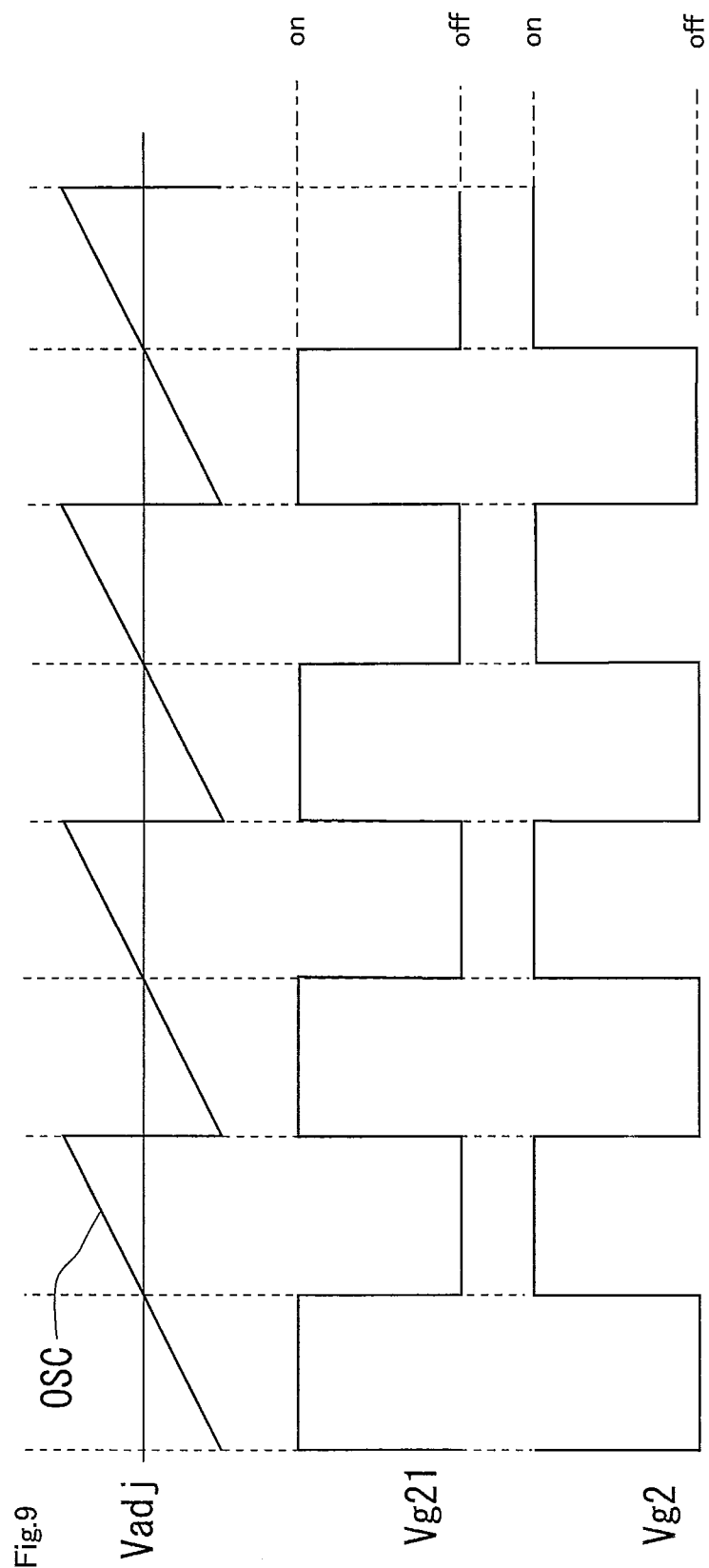
FIG. 9 is a view for explaining operation of a secondary side control circuit in the switching power supply device according to the second embodiment of the present invention.

FIG. 9 illustrates an operating waveform inside the secondary side control circuit 5b. In a time period during which the voltage Vadj is higher than the triangle wave signal OSC, the output of the comparator CP1 assumes a high level and thus a gate signal Vg21 is input to the switch element Q21 through the driver Hdr as an ON signal, while the output of the comparator CP2 assumes a low level and thus a gate signal Vg2 is input to the switch element Q2 as an OFF signal. In a time period during which the voltage Vadj is lower than the triangle wave signal OSC, the output of the comparator CP1 assumes a low level and thus the gate signal Vg21 is input to the switch element Q21 through the driver Hdr as an OFF signal, while the output of the comparator CP2 assumes a high level and thus a gate signal Vg2 is input to the switch element Q2 as an ON signal.

The operation of the step-up/down converter 13b that operates as described above will be described in detail below. To make the following description more general, one of two outputs that is higher than the other in output voltage (in FIG. 1, 24 V output) is set as Vo1, and the other one lower in output voltage (in FIG. 1, 12 V output) is set as Vo2. As described above, the switch elements Q21 and Q2 are alternately turned on/off with a constant duty ratio. Further, this duty ratio can be set to an arbitrary value depending on the ratio between the resistors R24 and R25. It is more effective when the duty ratio is set such that Don=(Vo2/Vo1) is satisfied. For example, in the case where the output voltages are 24 V and 12 V, the resistors R24 and R25 are set such that 12 V/24 V=50% is satisfied. As described above, it is assumed that the switch elements Q21 and Q2 are alternately turned on/off with a Don=(Vo2/Vo1).

Hereinafter, three states obtained depending on the output voltage of the Vo2 which is a non-stabilized output will be described. Voltage drops occurring in the switch elements Q21 and Q2 and the diodes D1 and D2, respectively are considerably smaller than the output voltages Vo1 and Vo2 and thus ignored for simplification.

First, operation under a load condition where the output Vo2 which is a non-stabilized output assumes rated output voltage (in FIG. 1, 12 V) will be described.

When the switch element Q21 is in an ON state and the switch element Q2 is in an OFF state, a difference between the voltages of the output Vo1 and output Vo2, i.e., (Vo1−Vo2) is applied to the reactor L1. Assuming that one cycle of the switching frequency of the step-up/down converter 13b is T, current ripple IL1 of the reactor L1 is $$IL1=\{(Vo1-Vo2)/L1\} \times T \times (Vo2/Vo1) \quad (1).$$

When the switch element Q21 is in an OFF state and the switch element Q2 is in an ON state, voltage of the output Vo2 is generated in the reactor L1. Current ripple IL1' of the reactor L1 at this time is $$IL1'=(Vo2/L1) \times T \times \{1-(Vo2/Vo1)\} \quad (2).$$

These two equations (1) and (2) are substantially the same. That is, the current ripple of the reactor L1 is the same when the switch element Q21 is in an ON state and the switch element Q2 is in an OFF state and when the switch element Q21 is in an OFF state and the switch element Q2 is in an ON state. On average, power is not transferred between the output Vo1 and output Vo2.

Figure 10:
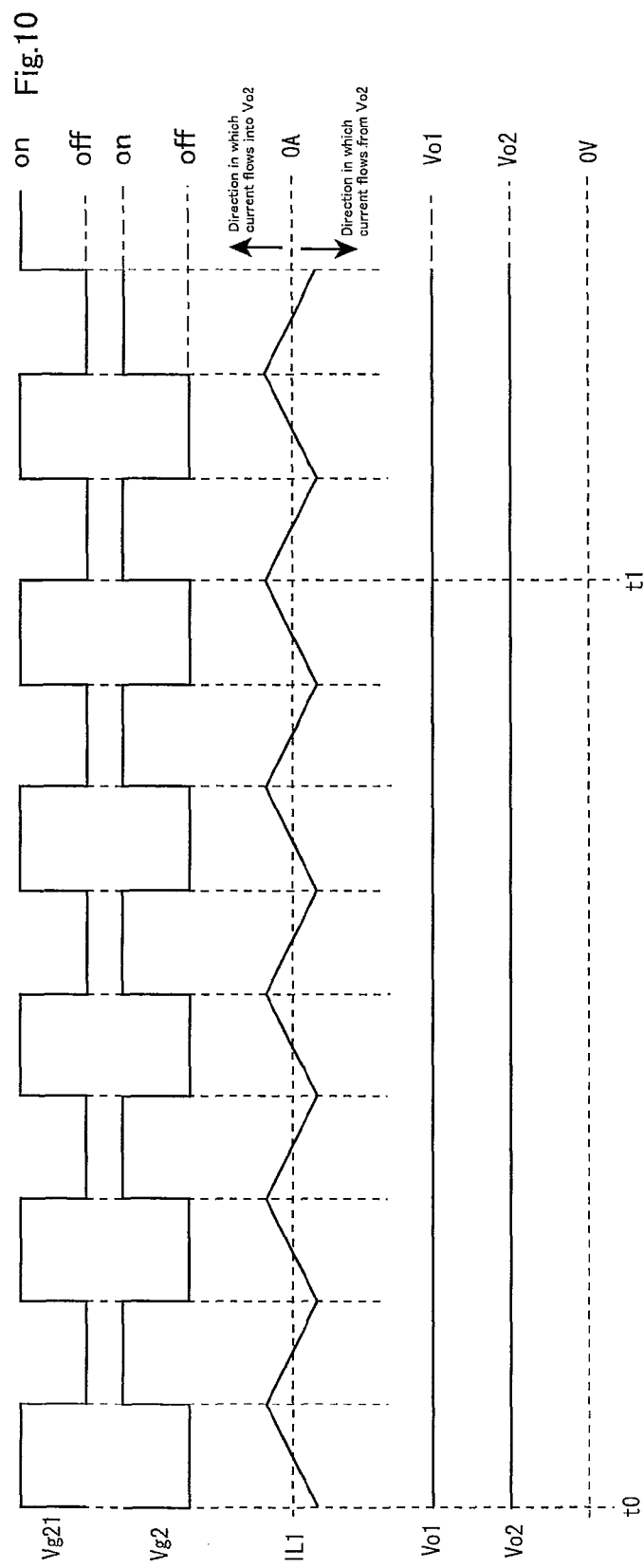
FIG. 10 is a view for explaining operation of the step-up/down converter in the switching power supply device according to the second embodiment of the present invention.

FIG. 10 is a view illustrating an operating waveform of the step-up/down converter 13b in the case where the output voltage of the output Vo2 which is a non-stabilized output is rated output voltage. As illustrated in FIG. 10, current of the reactor L1 goes back and forth between the Vo2 direction and Vo1 direction with 0 A as center, and the average current coincides with 0 A.

Secondly, operation under a load condition where the output Vo2 which is a non-stabilized output assumes Vo2a that is a lower voltage than rated output voltage Vo2 will be described.

When the switch element Q21 is in an ON state and the switch element Q2 is in an OFF state, a difference between the voltages of the output Vo1 and output Vo2, i.e., (Vo1−Vo2a) is applied to the reactor L1. Current ripple IL1a of the reactor L1 at this time is $$IL1a=\{(Vo1-Vo2a)/L1\} \times T \times (Vo2/Vo1) \quad (3).$$

When the switch element Q21 is in an OFF state and the switch element Q2 is in an ON state, output voltage Vo2a is generated in the reactor L1. Current ripple IL1a' of the reactor L1 at this time is $$IL1a'=(Vo2a/L1) \times T \times \{1-(Vo2/Vo1)\} \quad (4).$$

When the equation (3) is modified and assigned to the equation (4), $$T/L1=IL1a \times Vo1/\{Vo2 \times (Vo1-Vo2a)\} \quad (3')$$

$$IL1a'=IL1a \times \{Vo2a \times (Vo1-Vo2)\}/\{Vo2 \times (Vo1-Vo2a)\} \quad (4')$$

are obtained. Since Vo2>Vo2a is satisfied, the numerator is smaller than the denominator on the right side of the equation (4'), so that IL1a>IL1a' is satisfied.

That is, the current ripple of the reactor L1 generated at the time when the switch element Q21 is in an ON state and the switch element Q2 is in an OFF state is larger than the current ripple of the reactor L1 generated at the time when the switch element Q21 is in an OFF state and the switch element Q2 is in an ON state, so that the current of the reactor L1 changes in the direction in which power is supplied from the output Vo1 to the output Vo2.

Figure 11:
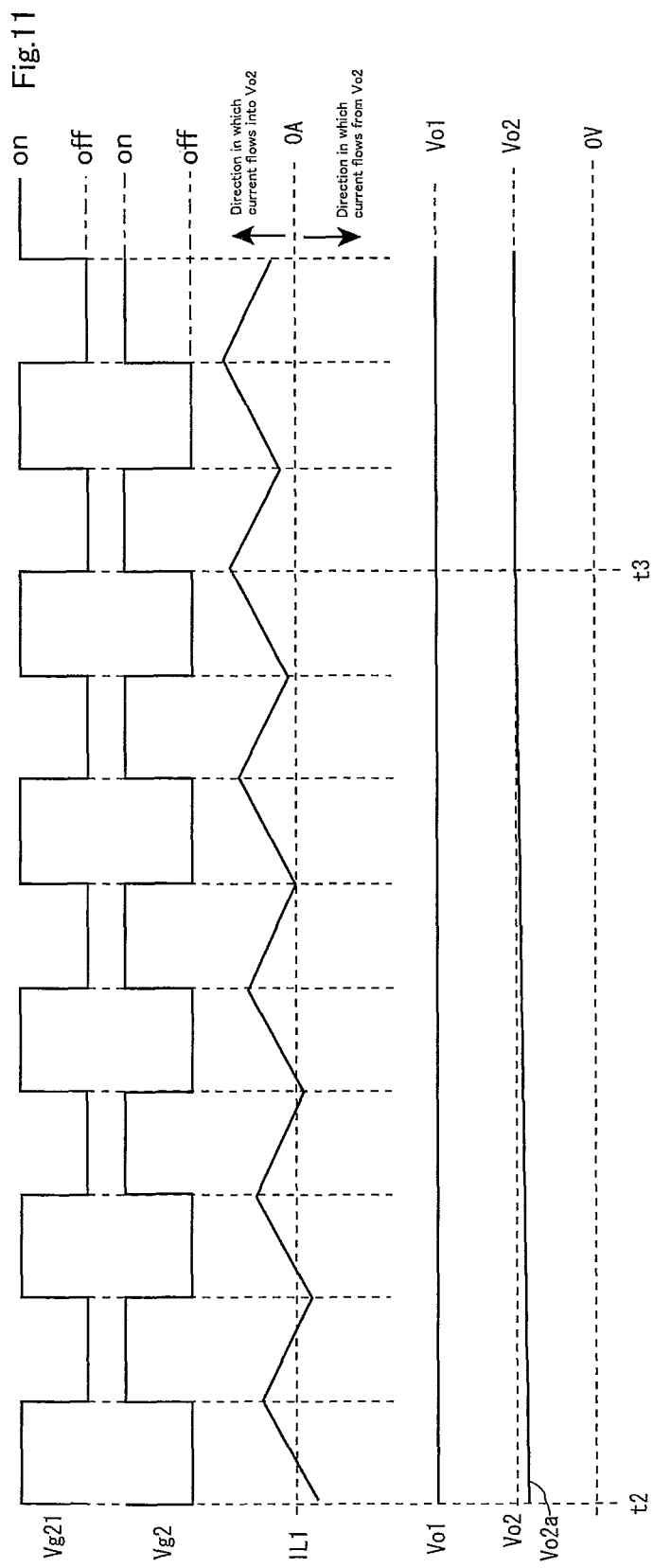
FIG. 11 is a view for explaining a step-down operation of the step-up/down converter in the switching power supply device according to the second embodiment of the present invention.

FIG. 11 is a view illustrating an operating waveform of the step-up/down converter 13b in the case where the output voltage of the output Vo2 which is a non-stabilized output is lower than rated output voltage. As illustrated in FIG. 11, current of the reactor L1 deviates in the direction in which power is supplied from the output Vo1 to the output Vo2.

The output Vo2 at time t2 assumes a voltage value of Vo2a. Then, the output Vo2 increases in its output voltage by receiving power supplied from the output Vo1 and, at time t3 at which the output Vo2 has come close to the rated output voltage Vo2, the current ripples IL1a and IL1a' of the reactor L1 are balanced to achieve stable operation. Further, a load condition where the output Vo2 becomes lower than the rated output voltage is when the Vo1 which is a stabilized output is light load or no load as illustrated in FIG. 2. However, power supplied to the non-stabilized output Vo2 by the operation of the step-up/down converter 13b of the present invention works as a load as viewed from the stabilized output Vo1, contributing to further improvement of the cross regulation characteristics.

Finally, operation under a load condition where the output Vo2 which is a non-stabilized output assumes Vo2b that is a higher voltage than the rated output voltage Vo2 will be described.

When the switch element Q21 is in an ON state and the switch element Q2 is in an OFF state, a difference between the voltages of the output Vo1 and output Vo2, i.e., (Vo1−Vo2b) is applied to the reactor L1. Current ripple IL1b of the reactor L1 at this time is $$IL1b=\{(Vo1-Vo2b)/L1\} \times T \times (Vo2/Vo1) \quad (5).$$

When the switch element Q21 is in an OFF state and the switch element Q2 is in an ON state, voltage of the output Vo2b is generated in the reactor L1. Current ripple IL1b' of the reactor L1 at this time is $$IL1b'=(Vo2b/L1) \times T \times \{1-(Vo2/Vo1)\} \quad (6).$$

When the equation (5) is modified and assigned to the equation (6), $$T/L1 = IL1b \times Vo1/\{Vo2 \times (Vo1-Vo2b)\} \quad (5')$$

$$IL1b' = IL1b \times \{Vo2b \times (Vo1-Vo2)\}/\{Vo2 \times (Vo1-Vo2b)\} \quad (6')$$

are obtained. Since Vo2<Vo2b is satisfied, the numerator is larger than the denominator on the right side of the equation (5'), so that IL1b<IL1b' is satisfied.

That is, the current ripple of the reactor L1 generated at the time when the switch element Q21 is in an ON state and the switch element Q2 is in an OFF state is smaller than the current ripple of the reactor L1 generated at the time when the switch element Q21 is in an OFF state and the switch element Q2 is in an ON state, so that the current of the reactor L1 changes in the direction in which power is supplied from the output Vo2 to output Vo1.

Figure 12:
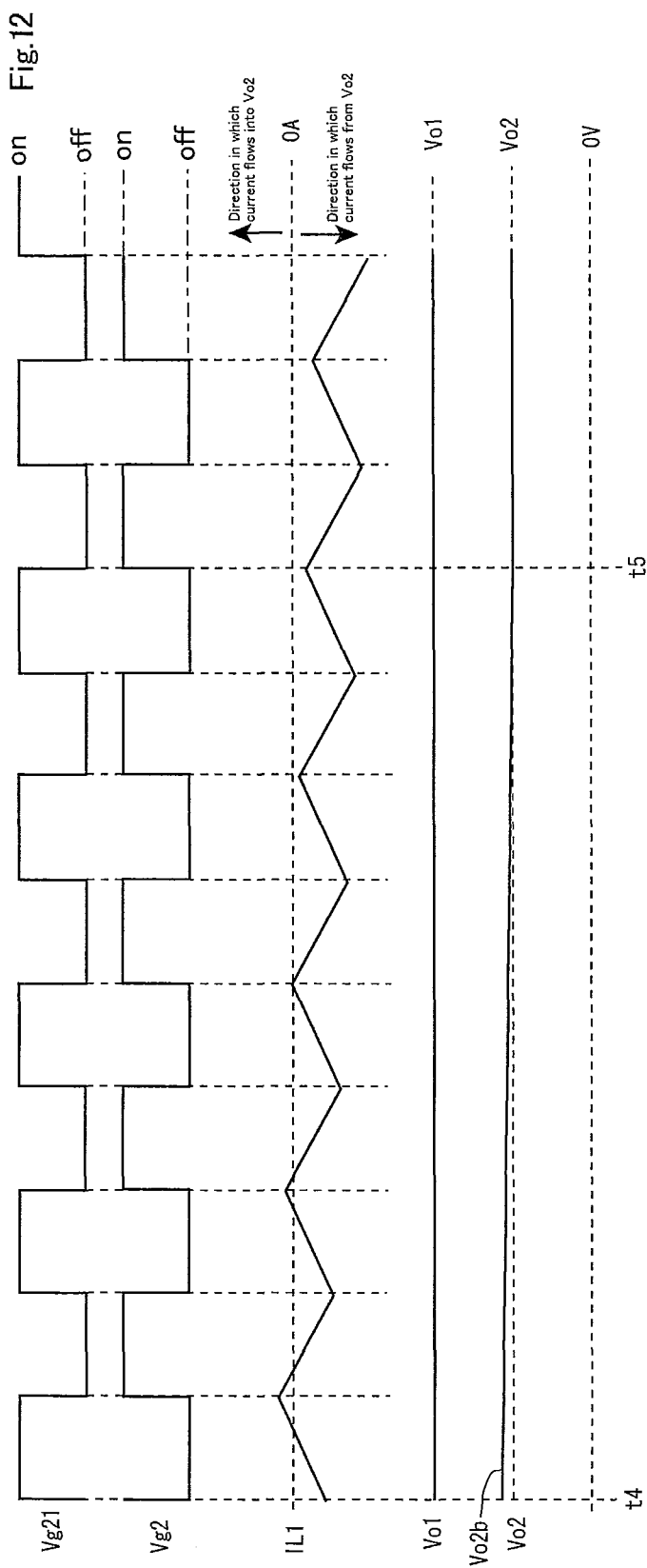
FIG. 12 is a view for explaining a step-up operation of the step-up/down converter in the switching power supply device according to the second embodiment of the present invention.

FIG. 12 is a view illustrating an operating waveform of the step-up/down converter 13b in the case where the output voltage of the output Vo2 which is a non-stabilized output is higher than rated output voltage. As illustrated in FIG. 12, current of the reactor L1 deviates in the direction in which power is supplied from the output Vo2 to output Vo1.

The output Vo2 at time t4 assumes a voltage value of Vo2b. Then, the output Vo2 decreases in its output voltage by supplying power to the output Vo1 and, at time t5 at which the output Vo2 has come close to the rated output voltage Vo2, the current ripples IL1b and IL1b' of the reactor L1 are balanced to achieve stable operation. Further, a load condition where the output Vo2 becomes higher than the rated output voltage becomes prominent as the load of the Vo1 which is a stabilized output increases. However, power is supplied from the non-stabilized output Vo2 to the stabilized output Vo1 by the operation of the step-up/down converter 13b of the present invention to reduce the power to be supplied from the secondary winding S1 to the stabilized output Vo1, contributing to further improvement of the cross regulation characteristics.

Third Embodiment

Figure 13:
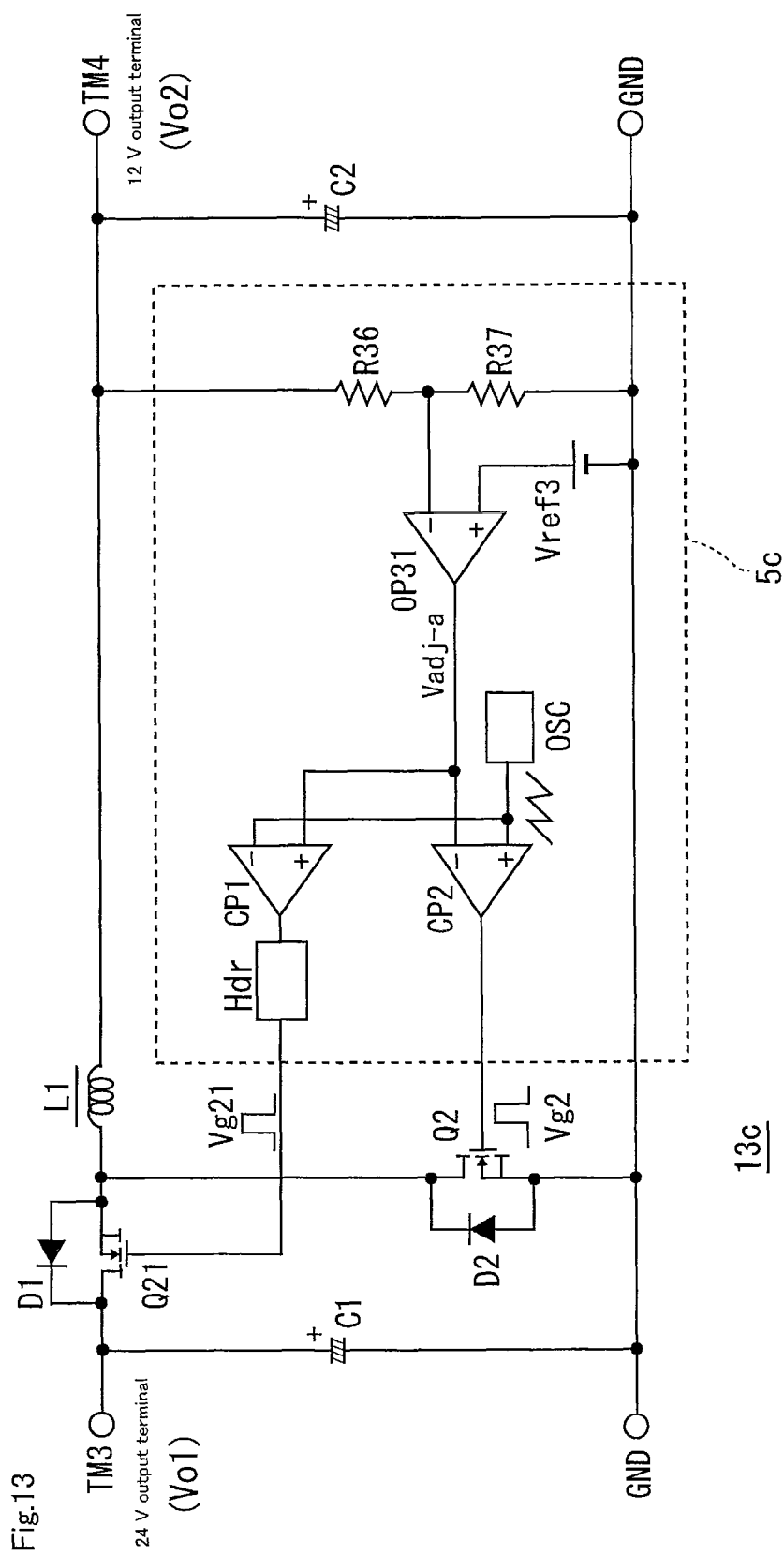
FIG. 13 is a basic circuit configuration diagram of a step-up/down converter in a switching power supply device according to a third embodiment of the present invention.

A third embodiment according to the present invention will be described. FIG. 13 is a view illustrating a more detailed configuration of the step-up/down converter 13c according to the third embodiment of the present invention and a secondary side control circuit 5c that ON/OFF controls the switch elements Q21 and Q2 in the step-up/down converter 13c. In FIG. 13, a portion surrounded by a dotted frame corresponds to the secondary side control circuit 5c. The secondary side control circuit 5c has a configuration in which the resistors R24 and R25 of the secondary side control circuit 5b in the second embodiment of FIG. 8 are replaced by resistors R36 and R37, and operational amplifier OP31.

Resistors R36 and R37 are connected in series to both ends of the Vo2 which is a non-stabilized output. Thus, voltage at the connection point of the resistors R36 and R37 corresponds to voltage obtained by dividing the voltage of the output Vo2 in a ratio of (R36):(R37). The connection point of the resistors R36 and R37 is connected to the inverting input terminal of the operational amplifier OP31.

Reference voltage Vref3 is connected to the non-inverting input terminal of the operational amplifier OP31. The operational amplifier OP31 outputs an error signal obtained by comparing the voltage at the connection point of the resistors R36 and R37 with the reference voltage Vref3 as voltage Vadj-a and inputs the voltage Vadj-a to the non-inverting input terminal of the comparator CP1 and the inverting input terminal of the comparator CP2. Other configurations are the same as those of the secondary side control circuit 5 of the second embodiment of the present invention, and hence the repetitive explanations are omitted.

Operation of the secondary side control circuit 5c will be described in detail below.

As illustrated in FIG. 13, the operational amplifier OP31 outputs an error signal between the voltage obtained by dividing the voltage of the non-stabilized output Vo1 by the resistors R36 and R37 and the reference voltage Vref3 as voltage Vadj-a. The voltage Vadj-a is input to the non-inverting input terminal of the comparator CP1 and the inverting input terminal of the comparator CP2 and then compared with a triangle wave signal input thereto from the triangle wave oscillator OSC. As in the second embodiment, the switch elements Q21 and Q2 are alternately turned ON/OFF with a duty ratio corresponding to the voltage Vadj-a. The voltage Vadj-a decreases when the voltage at the connection point of the resistors R36 and R37 becomes higher than the reference voltage Vref3 and increases when the voltage at the connection point of the resistors R36 and R37 becomes lower. That is, when the non-stabilized output Vo1 increases, the on-duty of the switch element Q21 is narrowed, while when the non-stabilized output Vo1 decreases, the on-duty of the switch element Q21 is widened.

In the secondary side control circuit of the second embodiment illustrated in FIG. 8, the duty ratio between the switch elements Q21 and Q2 is set constant. Actually, however, current flowing in the step-up/down converter 13 causes voltage drops to occur in the switch elements Q21 and Q2, and diodes D1 and D2, respectively, so that voltages generated in the reactor L1 during the ON period of the switch elements become different. Further, in general, there exists a time period during which both the switch elements Q21 and Q2 are turned off in their ON/OFF switching time in order to prevent the both elements from being turned on at the same time. Thus, although the method of the second embodiment can improve the cross regulation characteristics within a voltage accuracy of e.g., 5%, it is not possible to completely control the cross regulation characteristics to rated output voltage set based on the duty ratio between the switch elements Q21 and Q2. However, according to the third embodiment of FIG. 13, the voltage of the Vo2 which is a non-stabilized output is detected so as to control the duty ratio between the switch elements Q21 and Q2, thereby obtaining more accurate cross regulation characteristics.

Fourth Embodiment

Figure 14:
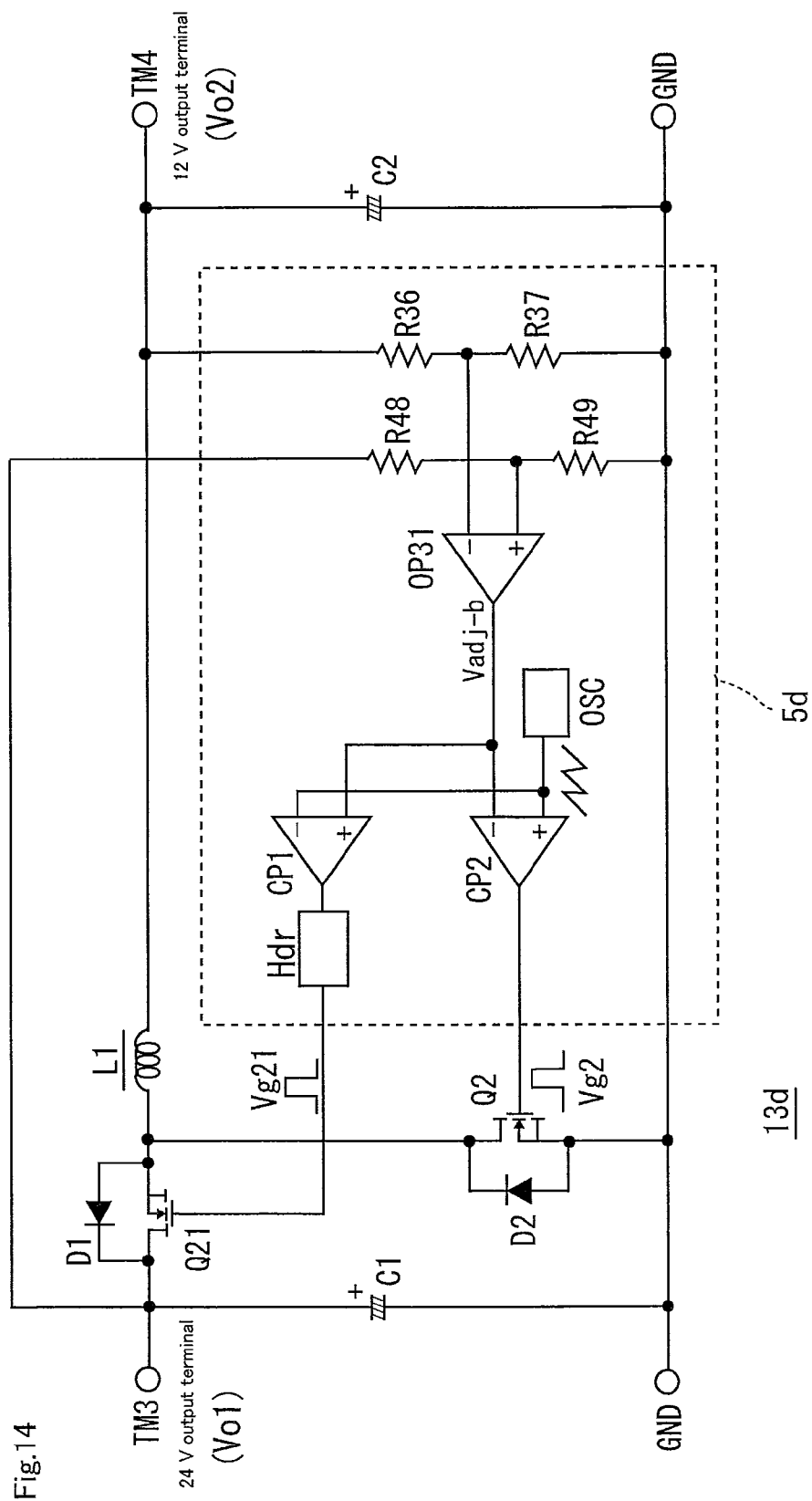
FIG. 14 is a basic circuit configuration diagram of a step-up/down converter in a switching power supply device according to a fourth embodiment of the present invention.

FIG. 14 illustrates a fourth embodiment of the present invention. The circuit configuration of a step-up/down converter 13d of the fourth embodiment of the present invention illustrated in FIG. 14 differs from the circuit configuration of the step-up/down converter 13c of the third embodiment of the present invention illustrated in FIG. 13 in that the circuit configuration of the step-up/down converter 13d includes a secondary side control circuit 5d in which, in place of the reference voltage Vref3 of the secondary side control circuit 5c, the connection point of resistors R48 and R49 connected in series to both ends of the output voltage Vo1 is connected to the non-inverting input terminal of the operational amplifier OP31. Other than that, the configuration is entirely the same.

It is ideal that the relationship between the output voltage Vo1 and output voltage Vo2 is the voltage times the turns ratio of the secondary winding S1 to the secondary winding (S1+S2). Accordingly, when the voltage of the stabilized output Vo1 changes due to a variation in the detection accuracy of the voltage detector 6 or droop of the output voltage in an overload state, voltage generated in the secondary winding S1 changes in proportion to the change of the voltage of the stabilized output Vo1. Thus, by changing a control voltage of the step-up/down converter 13d (voltage to be input to the non-inverting input terminal of the operational amplifier OP31) in accordance with the change in the output Vo1, power handled by the step-up/down converter 13d can be reduced.

The operational amplifier OP31 of the secondary side control circuit 5d in the fourth embodiment of the present invention illustrated in FIG. 14 receives as input voltage obtained by dividing the output voltage of the stabilized output Vo1 by the resistors R48 and R49 and voltage obtained by dividing the voltage of the non-stabilized output Vo2 by the resistors R36 and R37 and outputs an error signal between the two voltages as voltage Vadj-b. That is, when the output voltage of the stabilized output Vo1 changes, the control voltage of the secondary side control circuit 5d also changes. Assuming that R37=R49=r is satisfied, the relationship between the resistors R36 and R48 can be calculated based on the turns ratio S1:S2 of the secondary windings of the transformer T1 as follows:

R48={S1×R36+(S1−S2)×r}/S2, whereby the output voltages Vo1 and Vo2 can be controlled at the same ratio as the turns ratio between the secondary windings S1 and S2.

Fifth Embodiment

A fifth embodiment of the present invention will be described.

As illustrated in FIG. 1, each of the embodiments of the present invention has a configuration in which the step-up/down converter (13a to 13d) constituted by the switch element Q21, switch element Q2, reactor L1, secondary side control circuit (5a to 5d) and the like, is connected between the outputs Vo1 and Vo2, which is the same circuit configuration as that of a step-down chopper that has been generally used.

The conventional step-down chopper steps-down the output Vo1 on the side at which the output voltage is higher so as to output total power to the output Vo2, so that when the power of the output Vo2 is high, power loss occurring in the step-down chopper becomes large and, which requires a high-priced switch element or reactor. On the other hand, the step-up/down converters 13a to 13d according to the above first to fourth embodiments perform power conversion of only excess or deficiency of power of the non-stabilized output, making it possible to reduce the power to be handled, which allows the use of low-priced switch element or reactor.

However, in the case where the non-stabilized output is controlled to a set voltage in an abnormal state such as overload, current required to flow in the step-up/down converter 13a to 13d is increased, which may cause breakage of the switch element.

Figure 15:
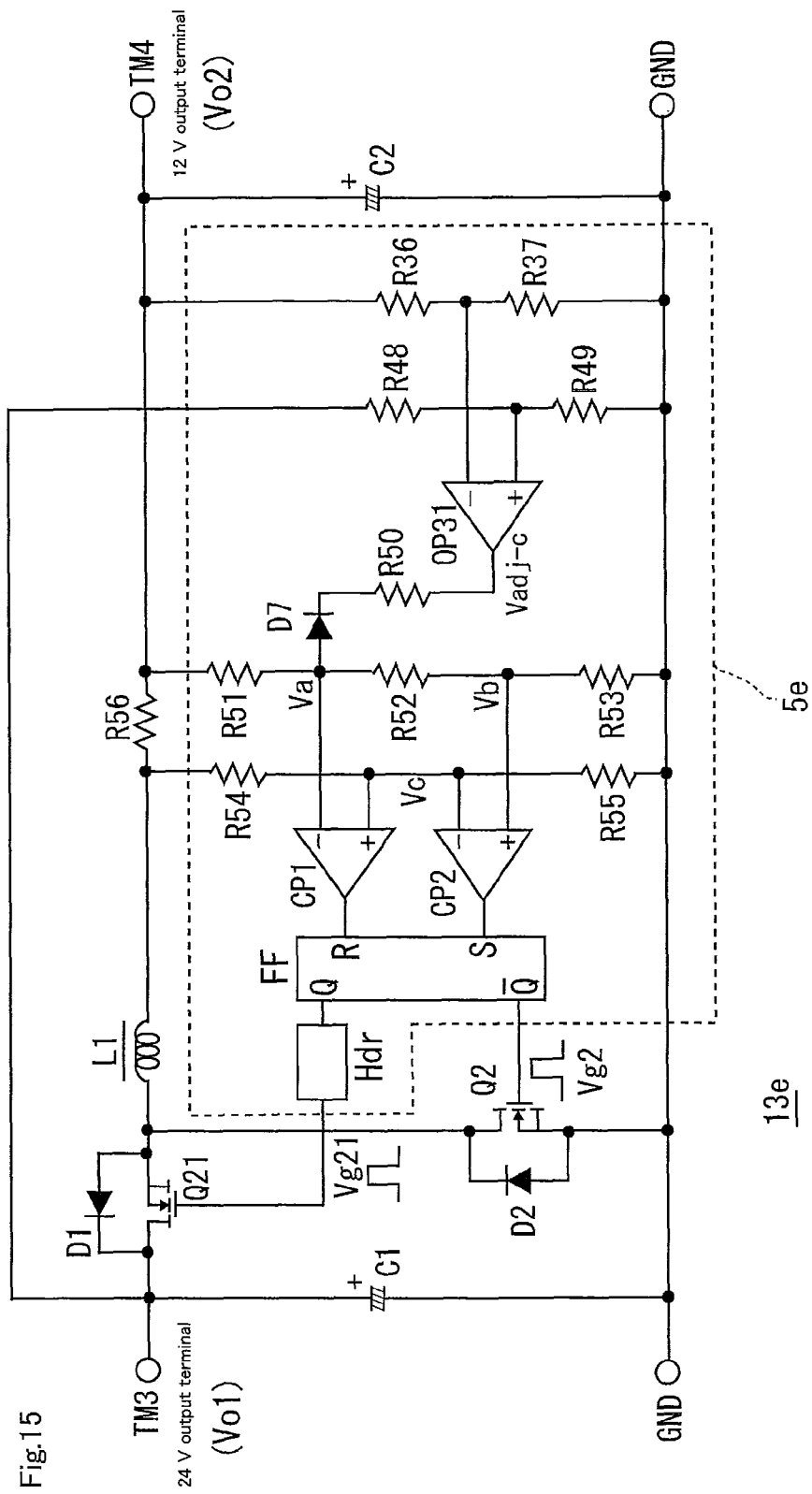
FIG. 15 is a basic circuit configuration diagram of a step-up/down converter in a switching power supply device according to a fifth embodiment of the present invention.

FIG. 15 illustrates a fifth embodiment of the present invention for solving the above problem. The fifth embodiment of the present invention illustrated in FIG. 15 differs from the fourth embodiment illustrated in FIG. 14 in that the fifth embodiment has a secondary side control circuit 5e. That is, a current detection resistor R56 is inserted between the reactor L1 and capacitor C2 of the step-up/down converter 13e to differentiate the configuration of the secondary side control circuit.

Resistors R51, R52, and R53 are connected in series between the connection point of the resistor R56 and the capacitor C2 and the GND terminal, the connection point between the resistors R51 and R52 is input, as voltage Va, to the inverting input terminal of the comparator CP1, and the connection point of the resistors R52 and R53 is input, as voltage Vb, to the non-inverting input terminal of the comparator CP2. Resistors R54 and R55 are connected in series between the connection point of the reactor L1 and the resistor R56 and the GND terminal, and the connection point of the resistors R54 and R55 is input, as voltage Vc, to the non-inverting input terminal of the comparator CP1 and the inverting input terminal of the comparator CP2.

The output terminal of the comparator CP1 is connected to a reset input terminal R of an RS flip-flop FF that changes its state at the rising edge, and the output terminal of the comparator CP2 is input to a set input terminal S of the RS flip-flop FF. An output Q of the RS flip-flop FF is connected to the gate terminal of the switch element Q21 through the driver Hdr that level-shifts a signal, and an output −Q thereof is connected to the gate terminal of the switch element Q2.

As in the case of the fourth embodiment illustrated in FIG. 14, the output voltage Vo2 is divided by the resistors R36 and R37 and is then connected to the inverting input terminal of the operational amplifier OP31, and the output voltage Vo1 is divided by the resistors R48 and R49 and is then connected to the non-inverting input terminal of the operational amplifier OP31. The output terminal of the operational amplifier OP31 is connected to the connection point of the resistors R51 and R52 through a resistor R50 and a diode D7 connected in series to each other. The diode D7 has the anode terminal connected to the connection point of the resistors R51 and R52.

Detailed operation of the secondary side control circuit 5e will be described below.

Figure 16:
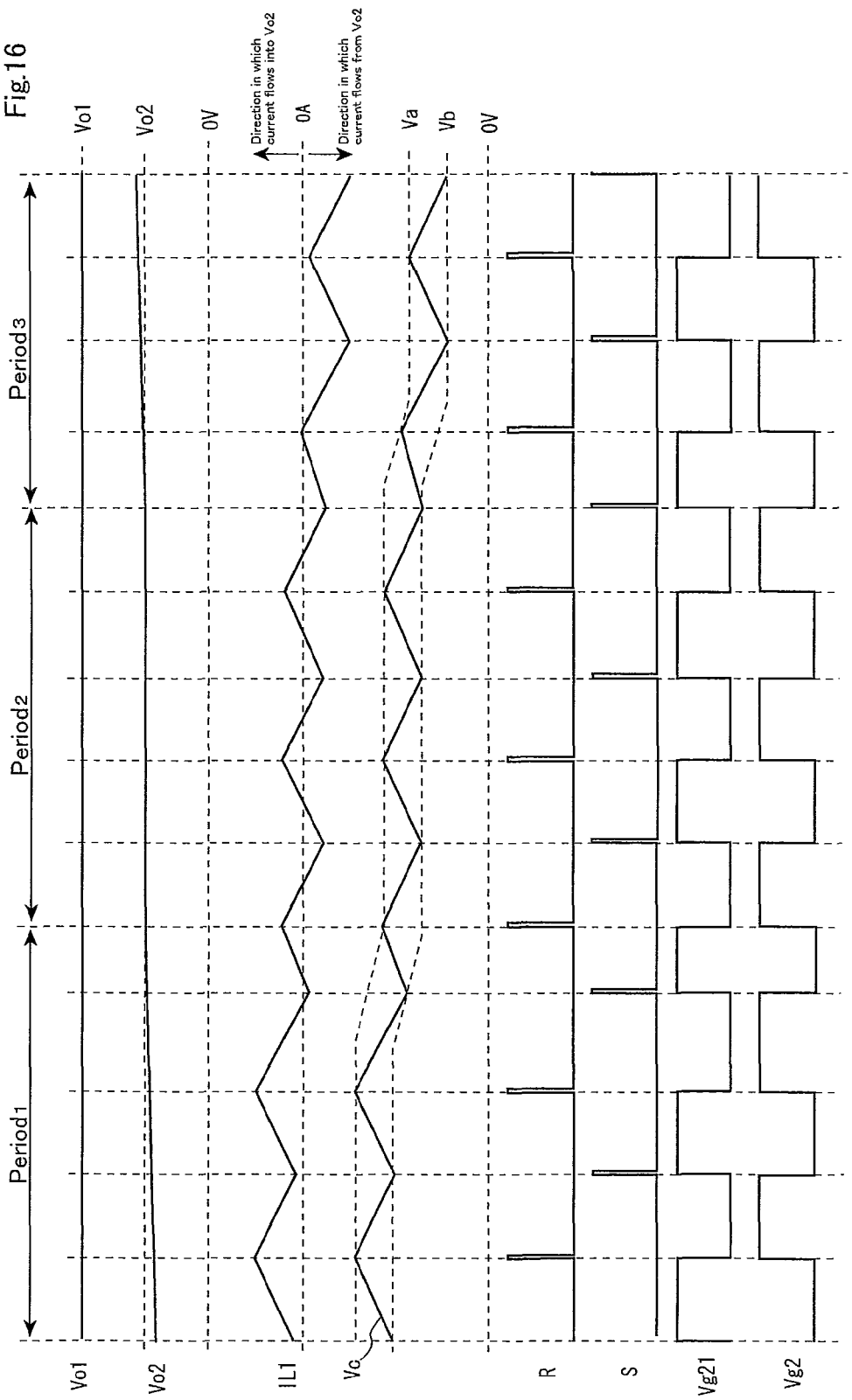
FIG. 16 is a view for explaining operation of the step-up/down converter in the switching power supply device according to the fifth embodiment of the present invention.

FIG. 16 illustrates an operating waveform of the step-up/down converter 5e.

The voltage Va at the connection point of the resistors R51 and R52 corresponds to voltage obtained by dividing the output voltage Vo2 in a ratio of (R51):(R52+R53), and voltage Vb at the connection point of the resistors R52 and R53 corresponds to voltage obtained by dividing the output voltage Vo2 in a ratio of (R52+R53):(R51), which is lower than the voltage Va. The voltage Vc at the connection point of the resistors R54 and R55 corresponds to voltage obtained by dividing the voltage between the connection point of the reactor L1 and the resistor R56 and the GND terminal in a ratio of R54:R55. The resistance values of the resistors R51 to R55 are set such that the voltage Vc is about several 10 mV lower than the voltage Va assuming that voltage drop does not occur in the resistor R56 and that the diode D7 is not connected to the connection point of the resistors R51 and R52.

In the case where the non-stabilized output Vo2 is lower than the set voltage Vo2 (time period 1 of FIG. 16), the output of the operational amplifier OP31 assumes a high level. The diode D7 is connected between the output terminal of the operational amplifier OP31 and the connection point of the resistors R51 and R52, so that there is no influence on the voltage Va at the connection point of the resistors R51 and R52 and the voltage Vb at the connection point of the resistors R52 and R53. Thus, when voltage drop does not occur in the resistor R56 as described above, the voltage Vc is lower than the voltage Va.

When the switch element Q21 is in an ON state, current flows in the reactor L1 in the direction from the output Vo1 to the output Vo1 with the result that voltage drop occurs in the resistor R56 and, accordingly, the voltage Vc increases. When the voltage Vc reaches the voltage Va, the output of the comparator CP1 assumes "high", and the output of the RS flip-flop FF is inverted to cause the switch elements Q21 and Q2 to be turned off and on, respectively. When the switch element Q21 is turned off, current flowing in the reactor L1 passes through the switch element Q2 to be discharged to the output Vo2, with the result that the current flowing in the reactor L1 gradually decreases. Accordingly, the voltage drop of the resistor R56 is reduced, and the voltage Vc decreases. When the voltage Vc decreases to the voltage Vb, the output of the comparator CP2 assumes "high", and the output of the RS flip-flop FF is inverted to cause the switch elements Q2 to be tuned off and the switch element Q21 to be turned on once again.

As described above, the step-up/down converter 13e can realize operation of the step-down converter that supplies power from the stabilized output Vo1 to the non-stabilized output Vo2 for compensating power deficiency as in the fourth embodiment illustrated in FIG. 14 by determining the ON periods of the switch elements Q21 and Q2 based on the peak value of the current flowing in the reactor L1 in the ON period of the switch element Q21 and the peak value of the current flowing in the reactor L1 in the ON period of the switch element Q2. Further, it is possible to restrict the maximum value of the current flowing from the output Vo1 to the output Vo2 by the resistance values of the resistors R51 to R55 and current detection resistor R56, so that excessively large current does not flow in the step-up/down converter 13e in an overload state, allowing the use of a low-priced switch element.

In the case where the non-stabilized output Vo2 is higher than the set voltage Vo2 (time period 3 of FIG. 16), the output of the operational amplifier OP31 assumes a low level. When the output of the operational amplifier 31 assumes a low level, current is drawn from the connection point of the resistors R51 and R52 through the resistor R50 and diode D7. When current is drawn from the connection point of the resistors R51 and R52 to the operational amplifier OP31, the voltage Va at the connection point of the resistors R51 and R52 and the voltage Vb at the connection point of the resistors R52 and R53 decrease. The resistance value of the resistor R50 is set such that the voltage Vb is about several 100 mV lower than the voltage Vc assuming that voltage drop does not occur in the resistor R56 in this state.

When the switch element Q2 is in an ON state, the voltage of the output Vo2 is applied to the reactor L1 to cause current to flow in the direction from the capacitor C2 to the reactor L1. This current generates voltage drop in the resistor R56 and thus the voltage Vc decreases. When the voltage Vc reaches the voltage Vb, the output of the comparator CP2 assumes a high level, and the output of the RS flip-flop FF is inverted to cause the switch elements Q2 and Q21 to be turned off and on, respectively. When the switch element Q2 is turned off, current flowing in the reactor L1 passes through the switch element Q21 to be discharged from the output Vo1 to the output Vo1, with the result that the current flowing in the reactor L1 gradually decreases. Accordingly, the voltage drop of the resistor R56 is reduced, and the voltage Vc increases. When the voltage Vc reaches the voltage Va, the output of the comparator CP1 assumes a high level, and the output of the RS flip-flop FF is inverted to cause the switch elements Q21 to be tuned off and the switch element Q2 to be turned on once again.

As described above, the step-up/down converter 13e can realize operation of the step-up converter that discharges excess power from the stabilized output Vo1 to the non-stabilized output Vo1 as in the fourth embodiment illustrated in FIG. 14 by determining the ON periods of the switch elements Q21 and Q2 based on the peak value of the current flowing in the reactor L1 in the ON period of the switch element Q2 and the peak value of the current flowing in the reactor L1 in the ON period of the switch element Q21. Further, it is possible to restrict the maximum value of the current flowing from the output Vo2 to the reactor L1 during the ON period of the switch element Q2 by the resistance values of the resistors R51 to R55, resistor R50, and current detection resistor R56, so that excessively large current does not flow in the step-up/down converter 13e in an overload state, allowing the use of a low-priced switch element.

In the case where the non-stabilized output Vo2 is equal to the set voltage Vo2 (time period 2 of FIG. 16), there is no excess or deficiency of power in the output Vo2, so that values of the voltage Va and voltage Vb are controlled such that the operation amplifier OP31 makes the current flowing in the reactor L1 become 0 A.

According to the above embodiments of the present invention, when the voltage of the non-stabilized output decreases or increases, the step-up/down converter (13a to 13e) is used to exchange excess or deficiency of power between the stabilized output side and the non-stabilized output side, so that it is possible to achieve a switching power supply device without involving power loss which has been observed in the conventional art but with high power efficiency.

Further, according to the above embodiments of the present invention, the magnitude relationship between voltage of the stabilized output and voltage of the non-stabilized output is not restricted. That is, there is not such a restriction that the operation is achieved only under a condition satisfying (voltage of stabilized output)>(voltage of non-stabilized output) or satisfying (voltage of stabilized output)<(voltage of non-stabilized output). Thus, although the 24 V output is set as the stabilized output and the 12 V output is set as the non-stabilized output, the relationship between them may be reversed. Even in this case, the same effect can be obtained.

Further, according to the above embodiments, it is possible to suppress a transient voltage change of the stabilized output not only for a static load but also for a dynamic load change to stabilize the output voltage of the non-stabilized output, thereby improving the voltage accuracy of the non-stabilized output.

Further, according to the fifth embodiment of the present invention, it is possible to restrict the current flowing in the step-up/down converter 13e, allowing a lower-priced switch element or reactor to be used.

Although the present invention has been described using concrete embodiments, the embodiments are merely illustrative and the present invention is not limited thereto.

EXPLANATION OF REFERENCE SYMBOLS

1: Switching power supply device
2: AC power supply
3: Full-wave rectifier bridge
4: Primary side control circuit
5a to 5e: Secondary side control circuit
6: Voltage detector
11, 12: Rectification smoothing circuit
13a to 13e: Step-up/down converter
T1: Transformer
P1: Primary winding of transformer T1
S1, S2: Secondary winding of transformer T1
P2: Tertiary winding of transformer T1
R1 to R10: Resistor
R24, R25, R36, R37, R48, R49, R50 to R56: Resistor
C1 to C7, C9: Capacitor
L1: Reactor
D1 to D7: Diode
Q1, Q2, Q21: Switch element
Q3: MOSFET
PC: Photocoupler
TM1, TM2: Input terminal
TM3: 24 V output terminal
TM4: 12 V output terminal
GND: GND terminal
GND1, GND2: Ground potential
Ld1, Ld2: Load
OSC: Triangle wave oscillator
OP1, OP2, OP31: Operational amplifier CP1, CP2: Comparator
Vop1: Output of operational amplifier OP1
Vop2: Output of operational amplifier OP2
Vg1: Gate signal of switch element Q1
Vg2: Gate signal of switch element Q2
Vg21: Gate signal of switch element Q21
Vref1 to Vref3: Reference voltage
FF: RS flip-flop
Hdr: Driver

The invention claimed is:

1. A switching power supply device that converts an AC power supply inputted to a primary side into a plurality of secondary side DC power supplies for output, wherein:
one DC power supply of the plurality of secondary side DC power supplies being a stabilized output having voltage stabilizing means for taking an output voltage by rectification smoothing a first secondary winding to stabilize the output voltage by feeding back the output voltage to the primary side;
the rest of the plurality of secondary side DC power supplies being non-stabilized outputs not having voltage stabilizing means for taking the output voltage by rectificatior smoothing a second secondary winding to control the output voltage to the primary side or a secondary side;
the output voltage from the stabilized output is set higher than the output voltage from a non-stabilized output of said non-stabilized outputs;
a step-up/down converter is connected between the stabilized output and the non-stabilized output; and
the step-up/down converter uses the step-down converter function to step-down the output voltage of the stabilized output to supply power to the non-stabilized output when the output voltage of the non-stabilized output falls below a first predetermined voltage, and
uses the step-up converter function to step-up the output voltage of the non-stabilized output to regenerate power to the stabilized output when the output voltage of the non-stabilized output exceeds a second predetermined voltage.

2. The switching power supply device according to claim 1, wherein the first predetermined voltage and the second predetermined voltage are each set within a voltage accuracy range which is defined such that the output voltage accuracy of the non-stabilized output assumes a predetermined accuracy, and the second predetermined voltage is set higher than the first predetermined voltage by a predetermined potential difference.

3. A switching power supply device that converts an AC power supply inputted to a primary side into a plurality of secondary side DC power supplies for output, wherein
one DC power supply of the plurality of secondary side DC power supplies being a stabilized output having voltage stabilizing means for taking an output voltage by rectification smoothing a first secondary winding to stabilize the output voltage by feeding back the output voltage to the primary side;
the rest of the plurality of secondary side DC power supplies being non-stabilized outputs not having voltage stabilizing means taking the output voltage by rectification smoothing a second secondary winding to control the output voltage to the primary side or a secondary side;
the output voltage of the stabilized output is set lower than the output voltage of a non-stabilized output of said non-stabilized outputs;
a step-up/down converter is connected between the stabilized output and the non-stabilized output; and
the step-up/down converter uses the step-up converter function to step-up the output voltage of the stabilized output to supply power to the non-stabilized output when the output voltage of the non-stabilized output falls below a first predetermined voltage, and
uses the step-down converter function to step-down the output voltage of the non-stabilized output to regenerate power to the stabilized output when the output voltage of the non-stabilized output exceeds a second predetermined voltage.

4. The switching power supply device according to claim 3, wherein
the first predetermined voltage and the second predetermined voltage are each set within a voltage accuracy range which is defined such that the output voltage accuracy of the non-stabilized output assumes a predetermined accuracy, and the second predetermined voltage is set higher than the first predetermined voltage by a predetermined potential difference.

5. A switching power supply device that converts an AC power supply inputted to the primary side into a plurality of secondary side DC power supplies for output, wherein
one DC power supply of the plurality of secondary side DC power supplies is a stabilized output having voltage stabilizing means for taking an output voltage by rectification smoothing a first secondary winding to stabilize the output voltage by feeding back the output voltage to the primary side,
the rest of the plurality of secondary side DC power supplies are non-stabilized outputs not having voltage stabilizing means for taking the output voltage by rectification smoothing a second secondary winding to control the output voltage to the primary side or a secondary side, and
a step-up/down converter having first and second switch elements alternately tuned on/off and a reactor is connected between the stabilized output and a non-stabilized output, the step-up/down converter being able to apply/receive power between the stabilized output and the non-stabilized output in both directions in accordance with the output voltage of the non-stabilized output, wherein
the step-up/down converter controls the duty ratio between the first and second switch elements such that the output voltage of the non-stabilized output assumes a predetermined voltage.

6. The switching power supply device according to claim 5, wherein
the step-up/down converter has means for detecting current flowing in the reactor and restricts the current flowing in the reactor by a predetermined current value during the ON periods of the first and second switch elements.

7. The switching power supply device according to claim 5, wherein
the step-up/down converter has means for detecting current flowing in the reactor and controls the peak value of the current flowing in the reactor during the ON periods of the first and second switch elements such that the output voltage of the non-stabilized output assumes a predetermined voltage.

* * * * *